(12) United States Patent
Suzuki

(10) Patent No.: US 7,532,668 B2
(45) Date of Patent: May 12, 2009

(54) TRANSMITTER AND TRANSMITTING METHOD, RECEIVER AND RECEIVING METHOD, PULSE DETECTION METHOD, AND TRACKING METHOD

(75) Inventor: Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 948 days.

(21) Appl. No.: 10/689,649

(22) Filed: Oct. 22, 2003

(65) Prior Publication Data

US 2004/0136468 A1 Jul. 15, 2004

(30) Foreign Application Priority Data

Nov. 7, 2002 (JP) .............. 2002-324394

(51) Int. Cl.
*H03K 7/04* (2006.01)
(52) U.S. Cl. ...................... 375/239; 375/295
(58) Field of Classification Search ............... 375/239, 375/295, 346, 147, 238, 316, 220
See application file for complete search history.

(56) References Cited

U.S. PATENT DOCUMENTS

| | | | | |
|---|---|---|---|---|
| 4,179,727 A | * | 12/1979 | Muto et al. ............... | 363/41 |
| 4,189,669 A | * | 2/1980 | van Loon et al. ........... | 318/811 |
| 5,148,127 A | * | 9/1992 | Cheon ...................... | 332/104 |
| 6,026,125 A | * | 2/2000 | Larrick et al. ............. | 375/295 |
| 2003/0043937 A1 | * | 3/2003 | Kobayashi et al. .......... | 375/340 |
| 2003/0058924 A1 | * | 3/2003 | Darby et al. ............... | 375/135 |
| 2005/0129153 A1 | * | 6/2005 | McCorkle ................. | 375/346 |

* cited by examiner

*Primary Examiner*—Temesghen Ghebretinsae
(74) *Attorney, Agent, or Firm*—Oblon, Spivak, McClelland, Maier & Neustadt, P.C.

(57) ABSTRACT

Method and apparatus for sending and receiving pulses in the ultra wide band communication system while avoiding spectrum problems. Carrier waves, for example, are generated with a frequency set in the center of the transmission band of 7.5 GHz to avoid the 5 GHz currently used by wireless LAN systems and frequencies below 3 GHz specified for spectrum mask by the FCC. Baseband pulses are then generated at time intervals equal to a fraction 1/n of this frequency (n is an integer). The baseband pulses are rectangular waves with a length that is an integer multiple of one period of the carrier wave on the specified frequency. Finally 3-cycle pulses are made by frequency-modulating the baseband pulses with the carrier waves.

12 Claims, 21 Drawing Sheets

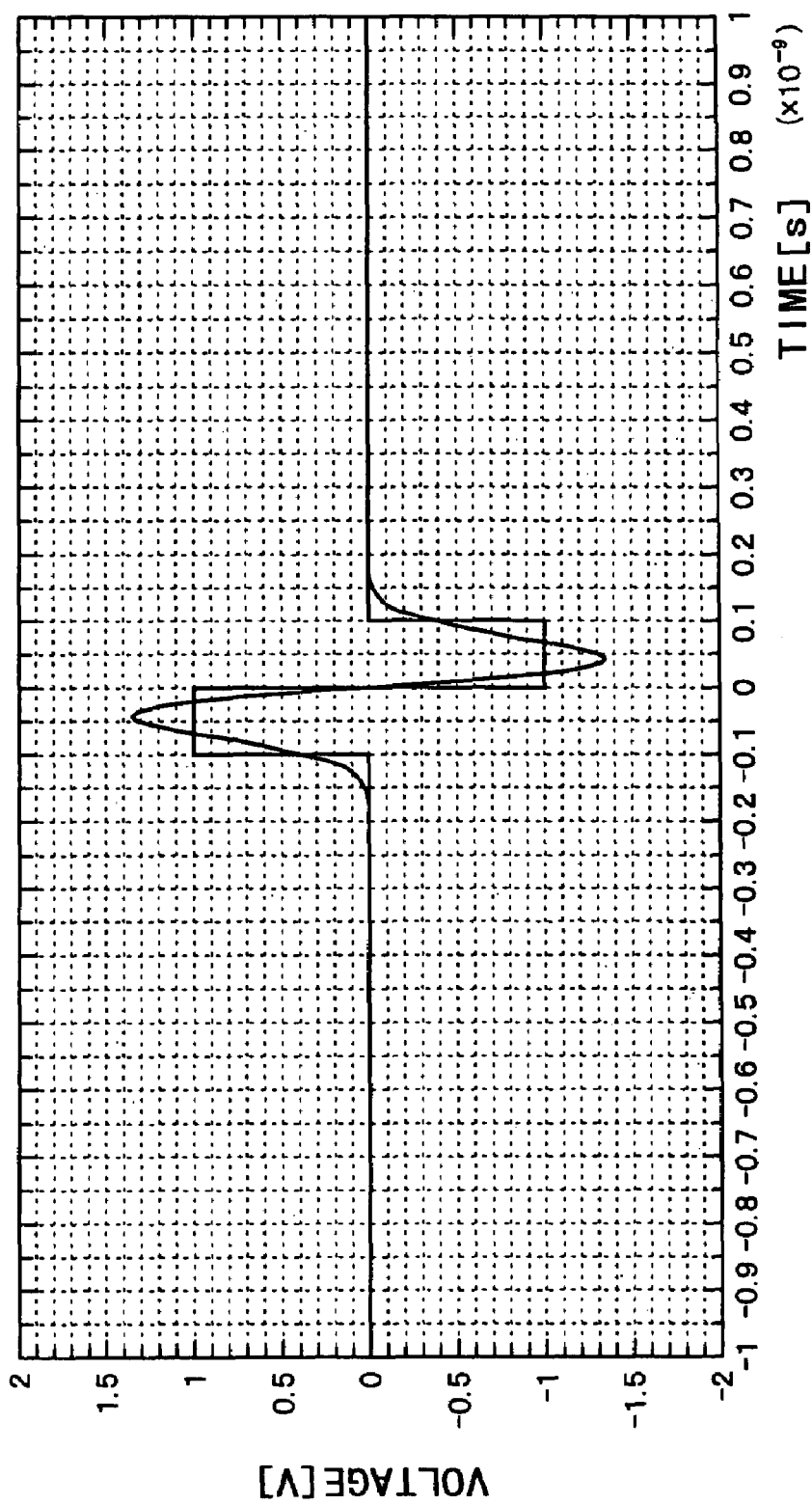
RELATED ART FIG. 1

F I G. 1 3
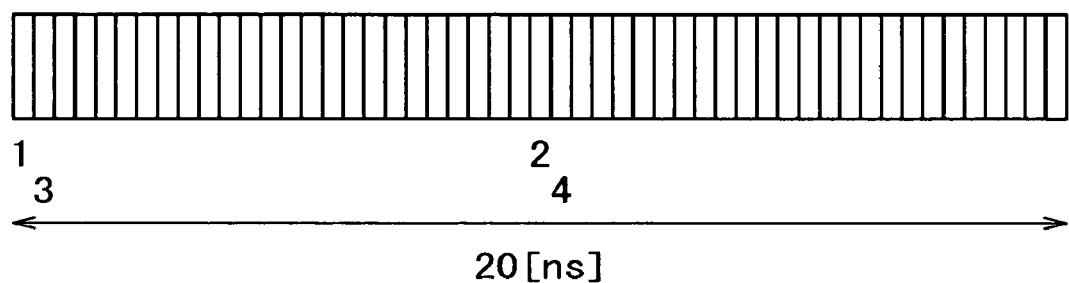
F I G. 1 4
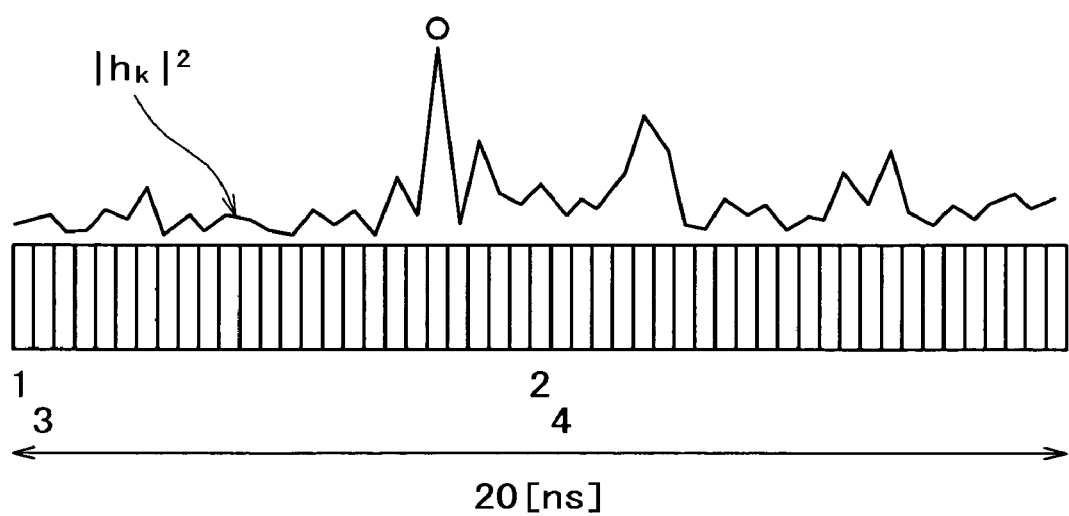

F I G. 1 9 A
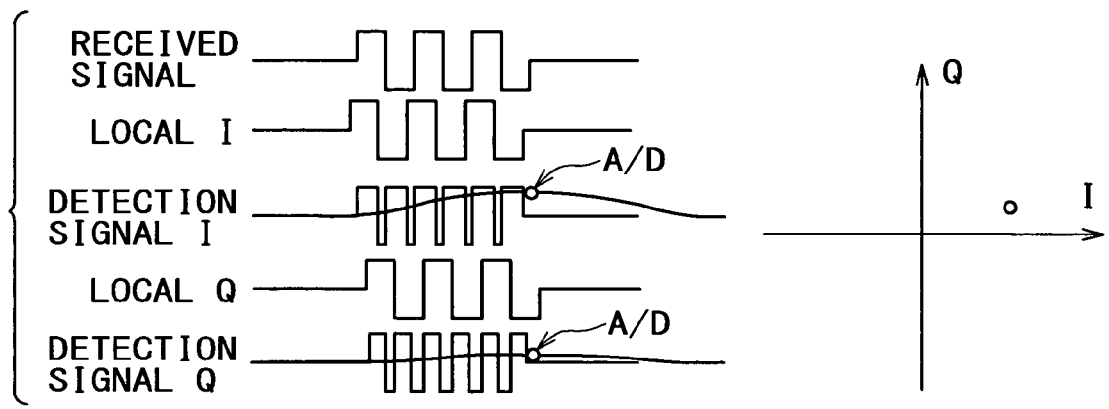
F I G. 1 9 B
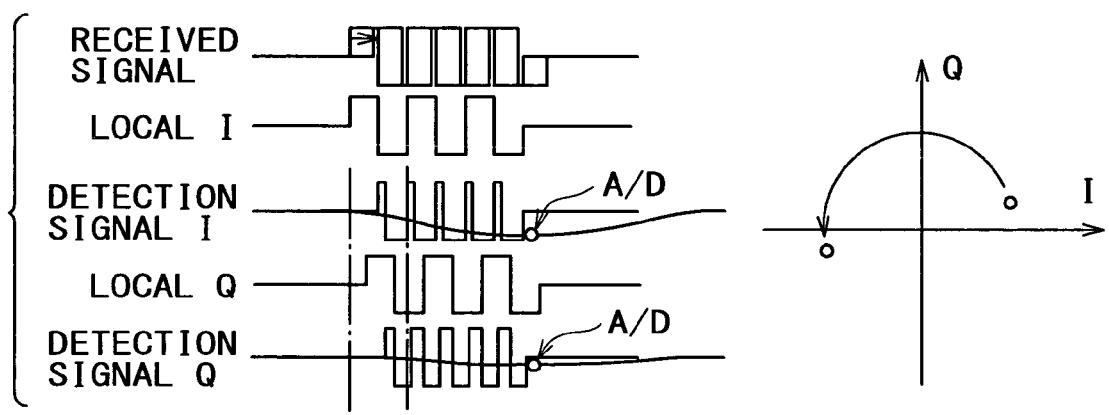
F I G. 1 9 C
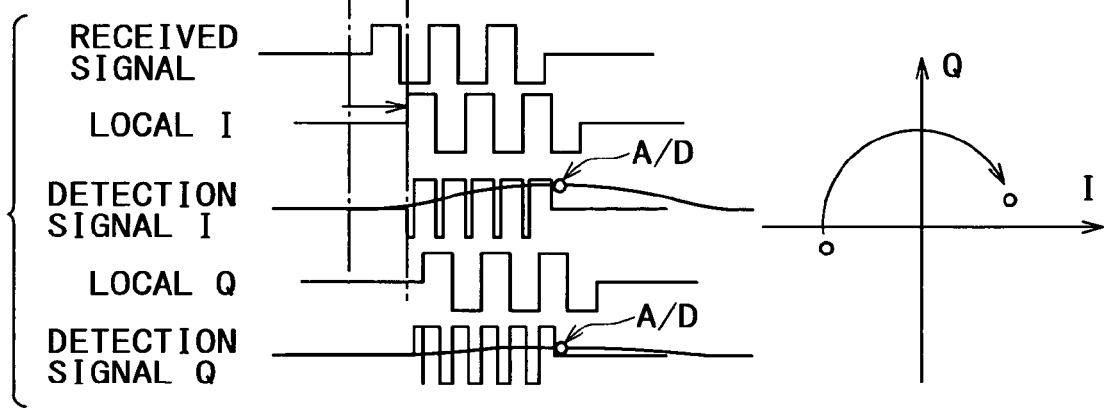

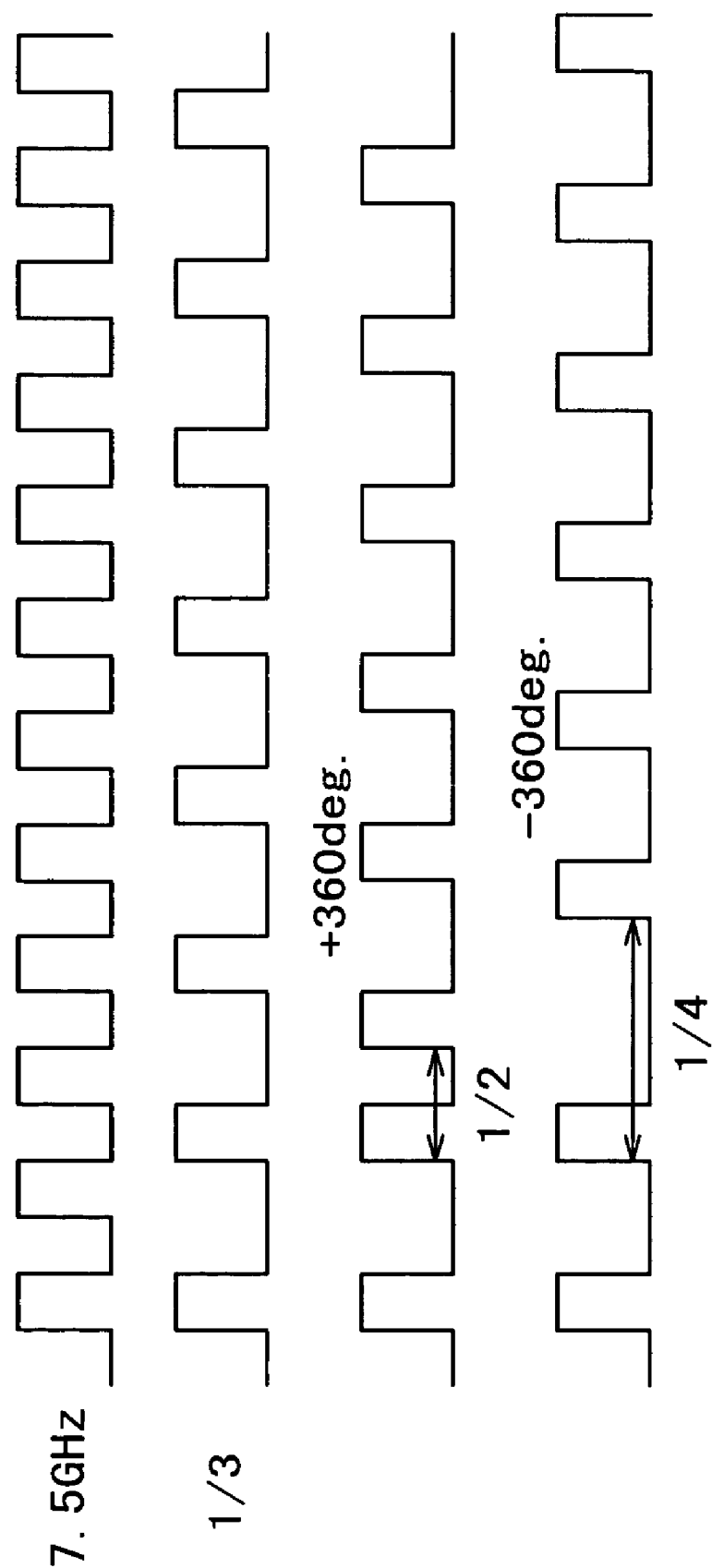

TRANSMITTER AND TRANSMITTING METHOD, RECEIVER AND RECEIVING METHOD, PULSE DETECTION METHOD, AND TRACKING METHOD

BACKGROUND OF THE INVENTION

1. Field of the Invention

The present invention relates to a transmitter for sending transmission waves and a receiver for receiving these transmission waves, and particularly relates to a transmitter and transmitting method, receiver and receiving method, pulse position detection method, and tracking method, for ultra wide band (UWB) communication utilizing an impulse signal train at extremely short cycles of several hundred picoseconds to form information signals, and transmit and receives this signal train.

More specifically, the present invention relates to a transmitter and transmitting method, receiver and receiving method, pulse position detection method, and tracking method for transmitting and receiving signals by means of pulses to avoid spectrum problems in an ultra wide band communication system, and relates in particular to a transmitter and transmitting method, receiver and receiving method, pulse position detection method, for ultra wide band (UWB) communication that reduces time required for synchronization with a simple circuit design.

2. Description of Related Art

Local area networks (LAN) configured by connecting multiple computers have become a popular method for sharing information such as electronic files and data or peripheral equipment such as printers and for exchanging information by e-mail and transmitting data contents.

In recent years, wireless LAN have become the focus of attention because wireless LAN eliminates most of the cable wiring used in work spaces such as in offices and makes it relatively easy to move communication terminals such as personal computers (PC). Wireless LAN systems have come into increasing demand as their speed becomes faster and cost becomes less expensive. Very recently, in particular, the use of personal area networks (PAN) made up of small-scale wireless networks for exchanging information among the multiple pieces of electronic equipment used in daily life is under scrutiny Recently, wireless LAN systems using the SS (Spread Spectrum) method are also being put into practical use. UWB transmission methods utilizing the SS method for applications such as PAN have been disclosed. (Refer to non-patent document 1 cited below as an example.)

The DS (Direct Spread) method, which is one kind of SS method, is also proposed. In the DS method, the transmitter spreads the occupied bandwidth by multiplying an information signal by a random code string called a "PN (Pseudo Noise)" code and transmits the spread information signal, while the receiver performs despreading by multiplying the received spread information signal by the PN code and reproduces the original information signal. In the UWB transmission method, the spread rate of this information signal is maximized to an extreme limit. Data is spread, for example, in an extremely wide bandwidth of 2 GHz to 6 GHz, and transmitted and received to achieve high-speed data transmission.

The UWB transmission method employs an impulse signal train at extremely short cycles of several hundred picoseconds to form information signals, and then transmits and receives this signal train. The occupied bandwidth is on the order of GHz so that the occupied bandwidth divided by its center frequency (for example, 1 GHz to 10 GHz) is approximately 1. This bandwidth is tremendously wide compared to other bandwidths commonly used in the so-called W-CDMA and cdma2000 methods as well as in wireless LAN using the SS (Spread Spectrum) and OFDM (Orthogonal Frequency Division Multiplexing) methods.

Impulse signals used for UWB transmission consist of extremely thin pulses, so the bandwidth used must be extremely wide in terms of frequency spectrum. Because of this requirement, input information signals in each frequency domain have only a very low power which is less than the noise level. Modulation methods for UWB transmission include: PPM (Pulse position Modulation) for expressing a code by means of the position between mono pulses, bi-phase modulation for expressing a code by means of mono pulse phase change, and amplitude modulation.

Non-patent document 1
NIKKEI ELECTRONICS ASIA Mar. 25, 2002
"Ultra Wideband: Revolutionary Wireless Technology is Born"

In the related art, the Gaussian-distributed mono cycle pulse is used as an impulse signal for UWB transmissions. Here, the Gaussian mono cycle pulse and the rectangular waveform mono cycle pulse are compared to determine the linearity required in a pulse generator. AS one example, a rectangular waveform mono cycle pulse with Tp=200 picoseconds [ps] at 1 volt [V] is used. An example with a Gaussian mono cycle pulse is also assumed using the following equation. The constants 3.16 and 3.3 in this equation are values found to possess the same spectrum as the rectangular waveform mono cycle pulse.

$$x(t) = 3.16 \frac{t}{T_P} \exp\left[\left(3.3 \frac{t}{T_P}\right)^2\right] \quad \text{(Eq. 1)}$$

The time waveform is shown in FIG. 1. The frequency characteristics for power spectrum densities of these mono cycle pulses are compared in FIG. 2. However, the power spectrum density [W/Hz=J] is shown when a pulse is sent each second at this voltage and driven at 50 [ohms].

As can be understood in FIG. 2, given a value of 100 [Mpulses per second], a power density which is 80 dB higher than this value is attained. Since the pulse peak power density shown here is approximately −211 [dBJ], this is approximately −41.3 [dBm per MHz] equaling −131.3 [dBW per Hz=dBJ] at 100 [Mpulses per second], which is precisely the boundary specified by the FCC.

The above allows making the following conclusions.

(1) The Gaussian waveform mono cycle pulse and the rectangular waveform mono cycle pulse use nearly the same transmission band.

(2) The mono cycle pulse of the Gaussian waveform requires a higher peak voltage and linearity, and is more difficult to process including power amplification than the rectangular waveform.

Mono cycle pulses are used in conventional UWB communications. FIG. 3 shows the frequency characteristics for power spectrum density shown in FIG. 2, but uses antilogarithm rather than decibels. There is no particular need for using antilogarithm but they often allow a better understanding since energy is shown linearly.

The following 2 points are conditions required on the spectrum.

(1) FCC regulations for spectrum masks do not permit radiation below 3 GHz.

(2) 5 GHz wireless LAN systems are present in the 4.9 to 5.3 GHz band so this band should be avoided.

Examining the power spectrum shown on the linear display reveals the following.

(1) If the above conditions are ignored then transmission will only be about half the power (3 dB).

(2) Ignoring the above conditions will likely cause large distortion on the pulse waveform and only about half the transmission energy will pass through the matching filter on the receive side.

(3) Ignoring the above conditions will cause a total loss of 6 [dB] or more.

The receiver configuration (related art) for the ultra wide band communication system is shown in FIG. 4. The receiver configuration shown in this figure resembles the DS-SS (Direct Sequence Spread Spectrum) receiver configuration.

In the example in the figure, the VCO (voltage-controlled oscillator) oscillates on the same frequency as the pulse period.

The receiver generates a pulse train with data of "All 0" according to the VCO timing. The receiver uses this pulse train to make a total of three waveforms each shifted by half (Tp/2) the pulse width Tp, and multiplies them by the received signal.

To detect the pulse position, a matching pulse timing is found by slightly shifting the VCO frequency (sliding correlation).

When a matching pulse timing is found, the energy increases due to the multiplication results and the pulse position can be detected.

At the stage where the pulse position is detected, operation shifts to tracking simultaneous with returning the intentionally shifted VCO frequency to the correct frequency, in order to maintain the timing.

A positive or negative value corresponding to the positive/negative of the pulse position difference is detected by subtraction of the energy obtained by multiplication with the waveform shifted by ±Tp/2 relative to the puncture (center) is. This value is used as a control voltage for pulse position tracking through the loop filter.

However, when the receiver is configured as shown in FIG. 4, the input signal branches into three paths and must possess three multiplier circuits so the circuit configuration becomes complex.

The frequency must also be changed during search and during tracking. Switching the frequency is time-consuming, so that a long time is required to establish synchronization.

During pulse position detection, the several increases in energy must be detected in order to detect the pulse position correctly in a noisy environment. The pulse position must be detected after first making a slight shift in the frequency, and obtaining the average of energy that increases a number of times, so that a long time is required to establish synchronization.

The device for shifting the frequency and performing tracking is comprised of analog circuits. However, these circuits are complex and affected by fluctuations, making it difficult to achieve stable operation.

During pulse position detection and tracking, the S/N (signal-to-noise) ratio deteriorates and characteristics also deteriorate due to use of the energy value.

SUMMARY OF THE INVENTION

In view of the above mentioned technical problems with the related art, the present invention has the object of providing a transmitter and transmitting method, receiver and receiving method, pulse detection method, and tracking method ideal for ultra wideband communications (UWB) by sending and receiving information signals comprised of an impulse signal train with an extremely short cycle of several hundred picoseconds.

Another object of the present invention is to provide a transmitter and transmitting method, receiver and receiving method, pulse detection method, and tracking method ideal for transmitting and receiving signals while avoiding spectrum problems in ultra wide band communication systems.

A further object of the present invention is to provide a transmitter and transmitting method, receiver and receiving method, pulse detection method, and tracking method ideal because of a simple circuit design and ability to shorten the time required for synchronization.

The transmitter and transmitting method of the present invention were contrived to resolve the above mentioned problems. A first aspect of the present invention contains:

a carrier generation means or step for generating a carrier wave possessing the specified frequency;

a baseband pulse generation means or step for generating a baseband pulse at time intervals equal to a fraction 1/n of the frequency (n is an integer); and a modulation means or step for modulating the baseband pulses with the carrier wave and generating N cycle pulses.

A second aspect of the present invention resides in a transmitter and transmitting method containing: a baseband pulse generation means or step for generating rectangular waves, as baseband pulses, with a length that is an integer multiple of one period of the carrier wave at the specified frequency; and a modulation means or step for modulating the baseband pulses with the carrier wave and generating N cycle pulses.

The carrier wave generation means or step need only generate a carrier wave possessing a frequency set in the center of the transmission band. Alternatively, the carrier wave generation means or step may be configured to generate a carrier wave possessing a frequency set in the center of a band that will not interfere with communication systems already in operation.

The modulation means or step may be configured to frequency-modulate the baseband pulses using the carrier wave. More preferably, the modulation means or step modulates by using a carrier wave synchronized with the pulse intervals.

For example, carrier waves are generated with a frequency set in the center of the transmission band of 7.5 GHz, by avoiding the frequencies below 3 GHz specified for spectrum mask by the FCC and the 5 GHz band currently used by wireless LAN systems. Baseband pulses are then generated at time intervals equal to a fraction 1/n of this frequency (n is an integer). The baseband pulses are rectangular waves with a length that is an integer multiple of one period of the carrier wave at the specified frequency. Then, 3-cycle pulses are made by frequency modulating the baseband pulses with the carrier waves.

In that case, there is virtually no energy from the start at 5 GHz and below 3 GHz so there is little pulse waveform deterioration and little energy loss even when the FCC's rule and currently existing communication systems using the 5 GHz band are considered. Furthermore, antenna and RF circuit design is very simple since the frequency bandwidth is small.

A third aspect of the present invention resides in a receiver and receiving method, which use a carrier wave frequency set in the center of the transmission band, and receives transmission signals comprised of N cycle pulses obtained by modulating, with the carrier wave, baseband pulses generated at a time interval equal to a fraction 1/n of the carrier wave (n is an integer), wherein the baseband pulse train is detected by quadrature detection with a carrier wave at the same frequency as during transmission.

The receiver or receiving method of the third aspect of the present invention can satisfactorily receive the N cycle pulse sent by the transmitter or transmitting method of the first and second aspects of the present invention.

The transmit signal may here contain a preamble section with the pulse intervals in fixed periods. In this case, the pulse time intervals are divided into intervals at least smaller than the pulse width. The baseband pulses, which were quadrature-detected at all the divided positions, are subjected to multiple repeated A/D conversion sequences. The pulse positions can then be estimated based on A/D values equivalent to the same positions within the pulse time intervals.

The energy value for the A/D value equivalent to the same position within the pulse time interval may be integrated here, and the integration value that has become the largest within the pulse time interval can be determined to be the pulse position.

This preamble section may be comprised of periodic patterns at times needed for A/D conversion of all positions. In this case, instead of integrating the energy value, the I and the Q values may be summed like a complex number, and the point where the energy value of this summed value has become large may be determined as the pulse position.

The status of the transmission path may be estimated by detecting the periodic pattern of the phase, and eliminating the effect of that pattern from the data that was summed like a complex number.

Along with determining the position where the received energy is high to be the pulse position, the pulse position may be corrected or tracking performed by detecting phase shifts in the carrier wave.

Tracking of the pulse position may also be performed by digital processing when the A/D conversion processing speed is sufficiently high.

On the other hand, for the information bit, phase conversion may be performed using analog operations such as summing, subtracting or inverting the I and Q values, and then selecting the phase with the optimum shift based on results from those analog operations.

A DS-SS type transmitter or receiver may be configured by adding a module for creating spread codes for spectrum spreading directly to the transmitter of the first or second aspect of the present invention, or to the receiver of the third aspect of the present invention.

Other objects, features and advantages of the present invention will be appreciated from the following detailed description of the preferred embodiments and the accompanying drawings.

BRIEF DESCRIPTION OF THE DRAWINGS

FIG. 1 is a graph showing the time waveforms for the Gaussian mono cycle pulse;

FIG. 13 is a drawing showing pulse detection and channel estimation operation in the detector section on the receive side of the transmitter/receiver shown in FIG. 8; and more specifically shows the structure of the channel estimation buffer;

FIG. 14 is a drawing showing pulse detection and channel estimation operation in the detector section on the receive side of the transmitter/receiver shown in FIG. 8; and more specifically shows a state identifying points having maximum amplitude, among 50 points of amplitude smoothly joined within a pulse interval of 20 nanoseconds;

FIG. 19 is a drawing for showing phase correction based on continuous measurement results when there is a shift in the reference phase;

FIG. 20 is a drawing showing the 1/3 frequency divider for 7.5 GHz dividing by 2 or dividing by 4 only one time, and returning the phase back ±360 degrees;

DETAILED DESCRIPTION OF THE PREFERRED EMBODIMENTS

The preferred embodiments of the present invention are described in detail below in reference with the accompanying drawings.

The present invention utilizes N cycle pulses as transmission impulse signals rather than mono cycle pulses, in order to avoid spectrum problems described previously for ultra wideband communication system. The present invention further utilizes a device with a simple circuit design and reduces the time required for synchronization. The following descriptions in the present specifications for the present invention provide examples for transmissions at 50 Mbps using 3-cycle pulses at a center frequency of 7.5 GHz.

Figure 2:
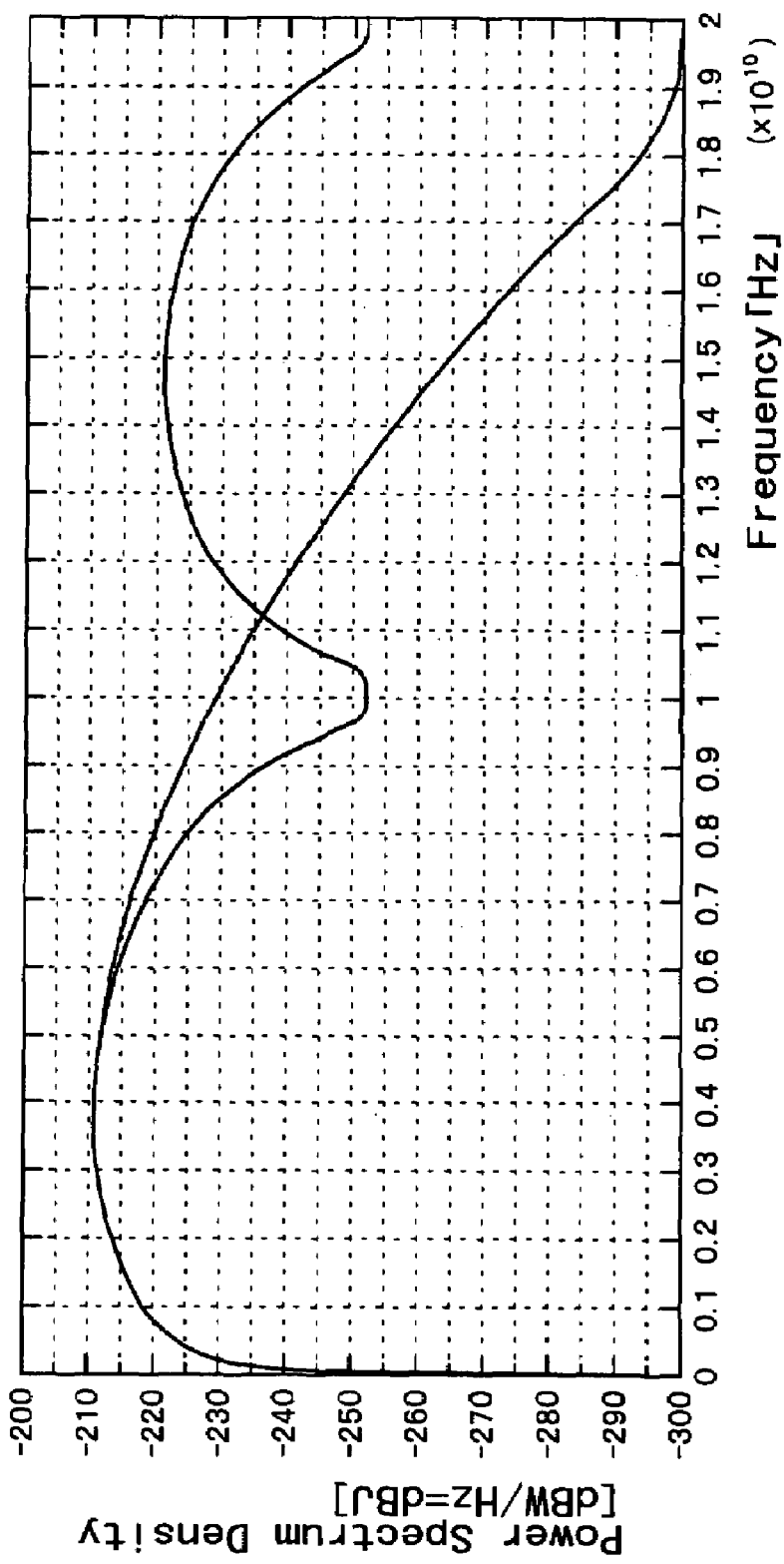
FIG. 2 is a graph showing frequency characteristics of the power spectrum density for Gaussian and rectangular mono cycle pulses.
Figure 3:
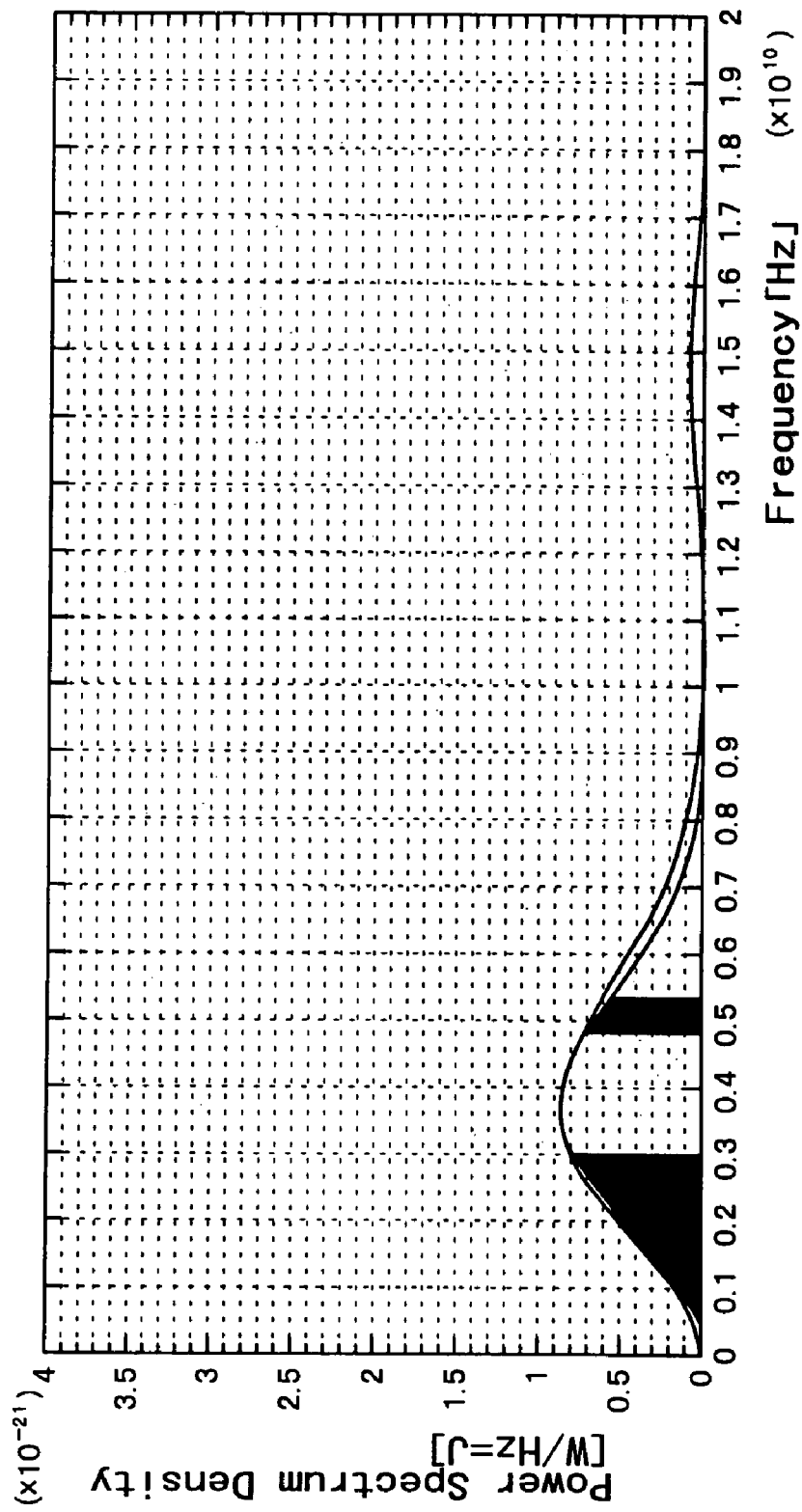
FIG. 3 is a graph showing frequency characteristics of the power spectrum density for Gaussian and rectangular mono cycle pulses.
Figure 4:
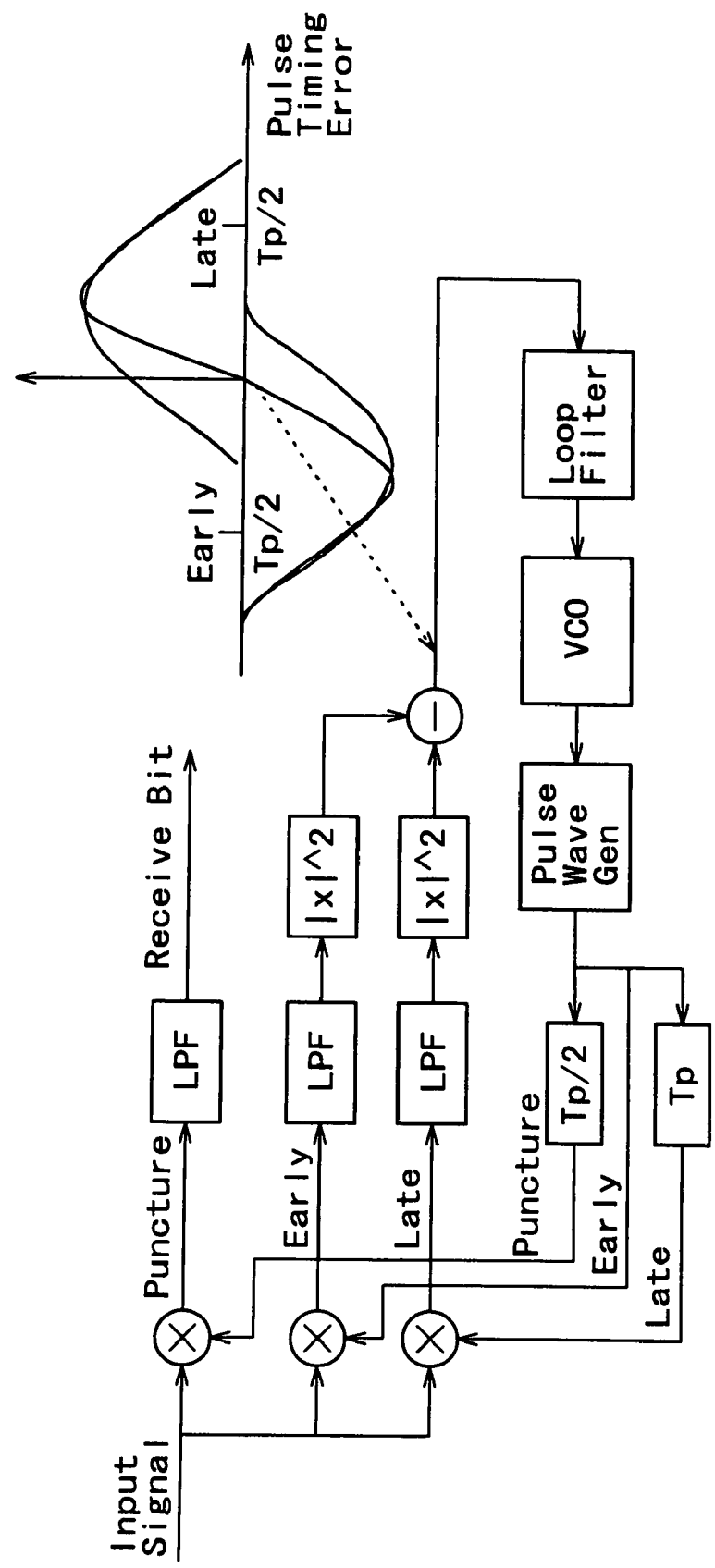
FIG. 4 is a drawing showing the structure of a receiver of the related art for ultra wide band communication systems.
Figure 5:
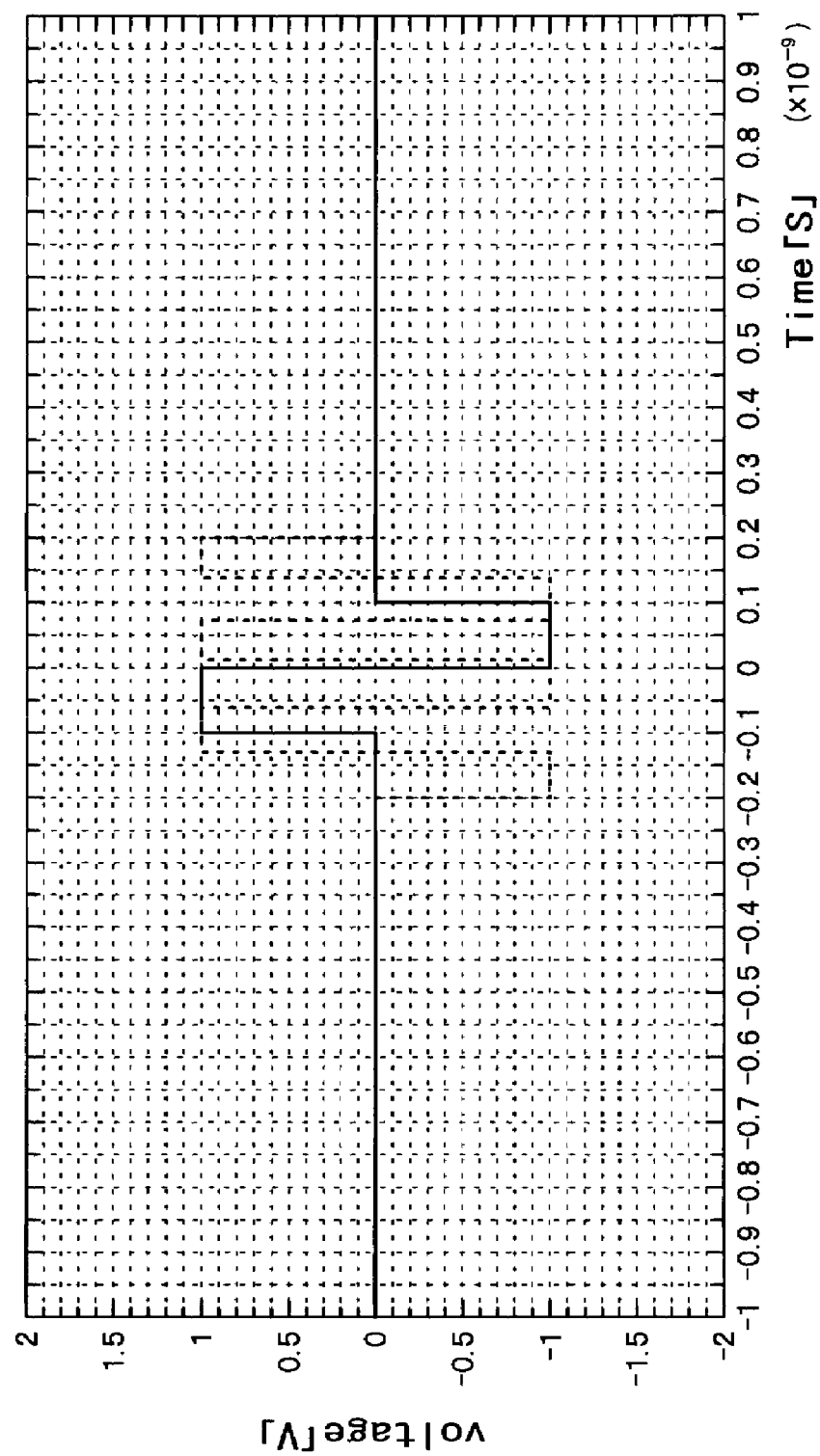
FIG. 5 is a drawing showing the 3-cycle pulse of the first embodiment of the present invention overlaid on the rectangular waveform of the mono cycle pulse of the related art.
Figure 6:
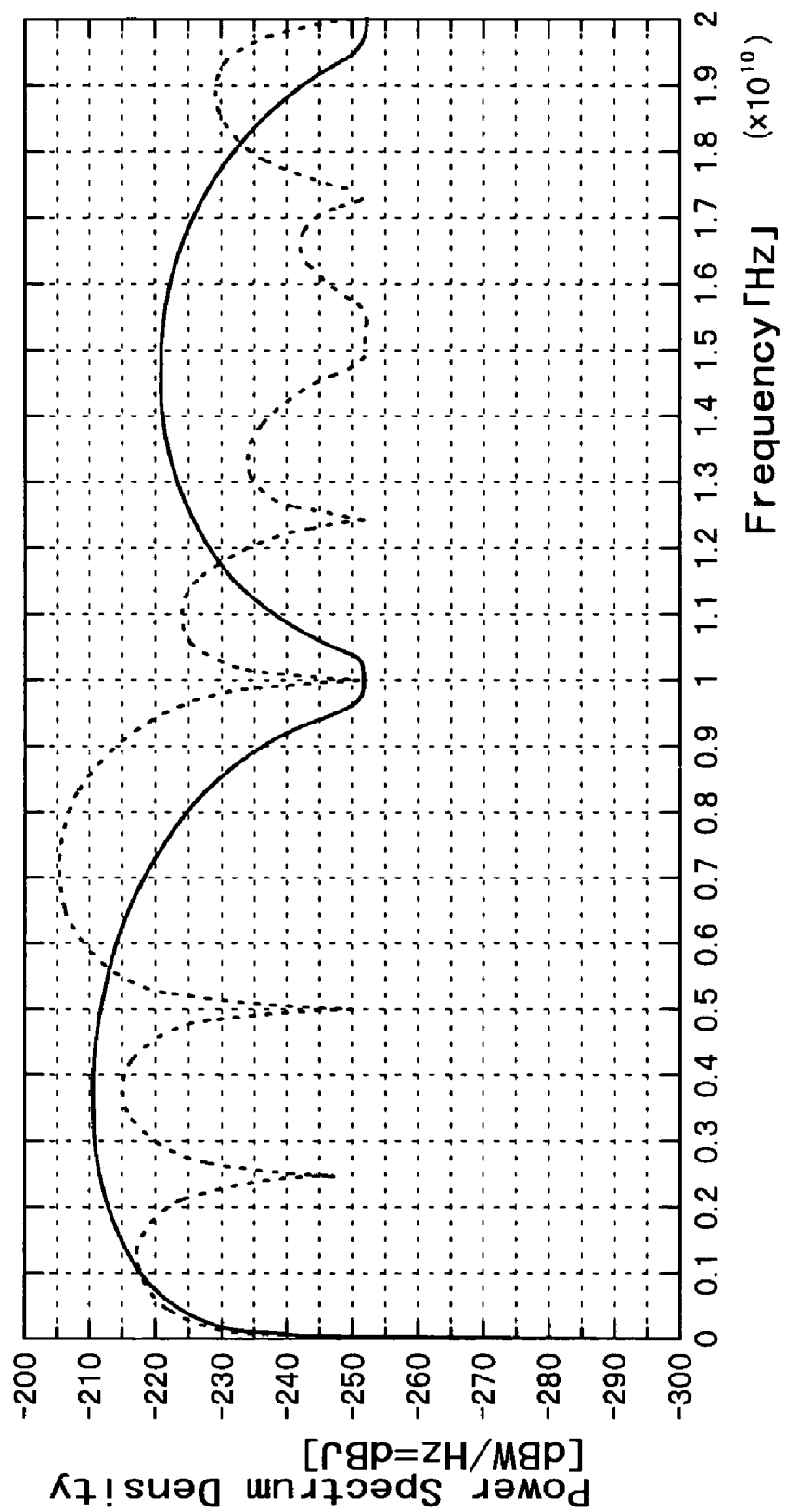
FIG. 6 is a chart expressing the power spectrum as decibels, for the mono cycle pulse of the related art and the 3-cycle pulse of the first embodiment of the present invention.
Figure 7:
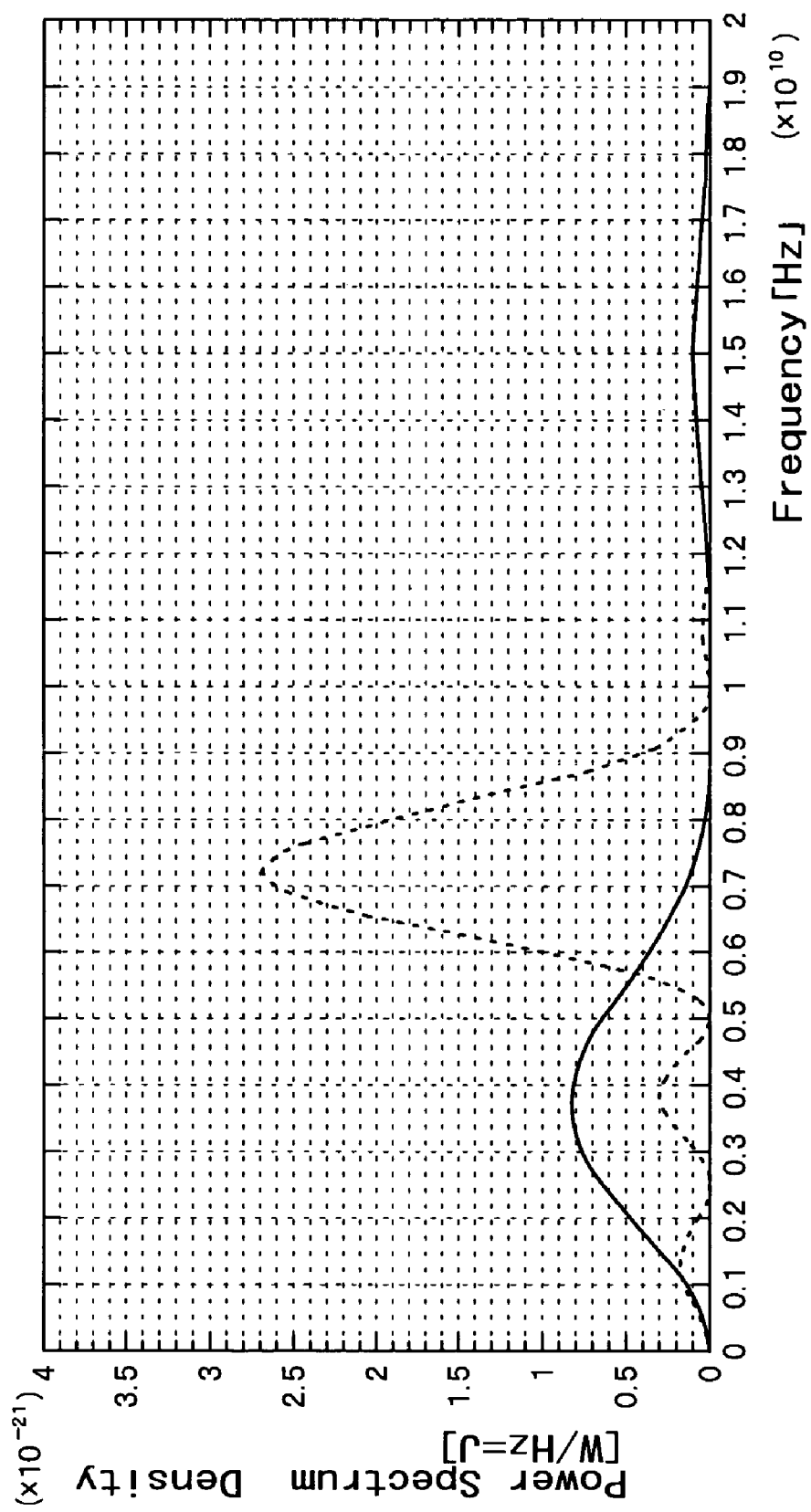
FIG. 7 is a chart linearly expressing the power spectrum of the mono cycle pulse of the related art and the 3-cycle pulse of the first embodiment of the present invention.

FIG. 5 is a drawing showing the 3-cycle pulse of the first embodiment of the present invention overlaid on the rectangular waveform of the mono cycle pulse of the related art. FIG. 6 and FIG. 7 respectively show the power spectrum for these pulse waveforms expressed in decibels and in a linear form.

As can be seen from FIG. 6 and FIG. 7, the 3-cycle pulse has a power density improved approximately 5 dB compared to the mono cycle pulse. This improvement results from the doubled continuous pulse time and the halved occupied bandwidth even though the pulse voltage was the same, and does not represent a significant problem.

The following can be concluded from using 3-cycle pulse as impulse signals in ultra wide band communication systems.

(1) From the start there is virtually no energy at 5 GHz and below 3 GHz so there is little pulse waveform deterioration and little energy loss even when the FCC's rule and currently existing communication systems using the 5 GHz band are considered.

(2) Antenna and RF circuit design is very simple since the frequency bandwidth is small.

Figure 8:
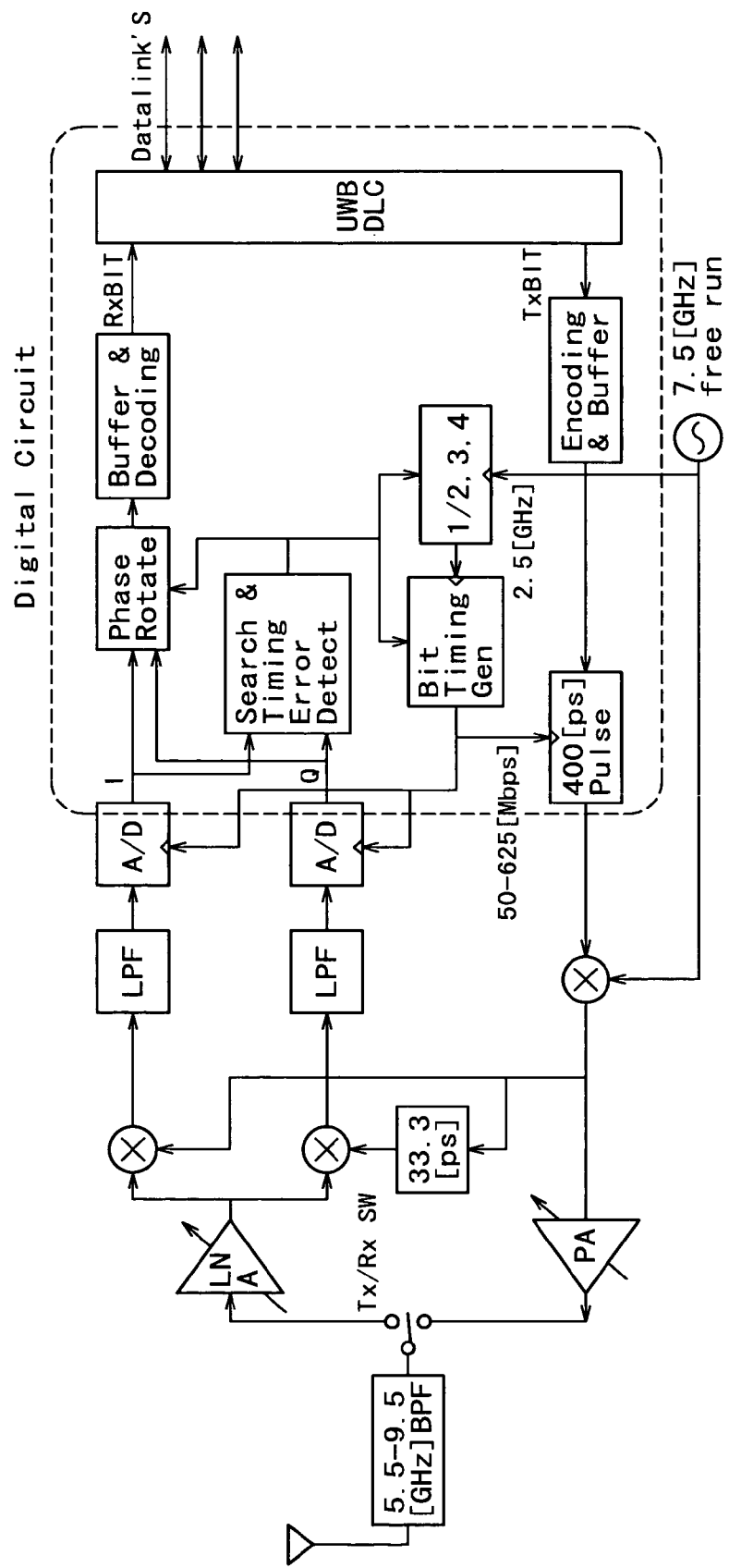
FIG. 8 is a diagram showing the structure of the transmitter of the first embodiment of the present invention.

FIG. 8 is a diagram showing the structure of the transmitter/receiver of the first embodiment of the present invention. The transmitter/receiver shown in the figure is capable of functioning as a transmitter/receiver for ultra wide band communication systems.

Figure 9:
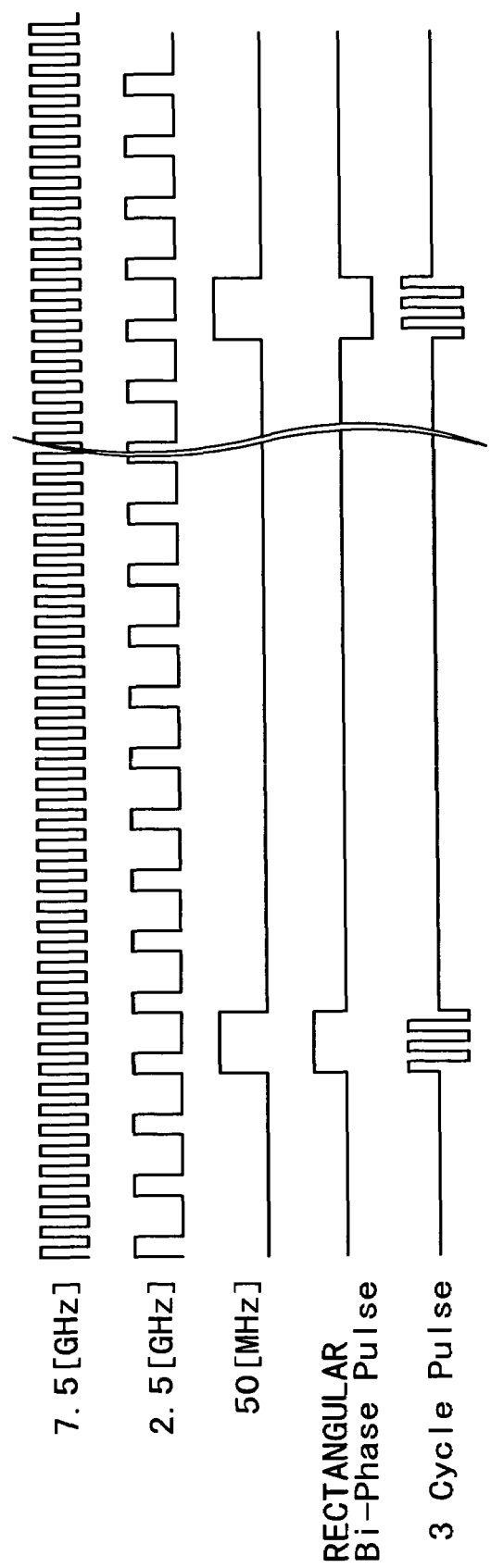
FIG. 9 is a timing chart showing the operating characteristics of the transmitter shown in FIG. 8 during transmitting.

FIG. 9 shows the operating characteristics of the transmitter/receiver shown in FIG. 8 during transmitting. The transmitter operation is described below in reference to FIG. 9.

(1) The free-running oscillator generates a signal comprised of a 7.5 GHz frequency.

The accuracy of the TXCO (temperature compensated crystal oscillator) forming the frequency standard is 1 ppm. The frequency of the carrier wave is the center of the transmission band and more preferably is in a band that will not interfere with existing communication systems.

(2) The frequency divider generates 2.5 GHz by dividing the 7.5 GHz frequency by 3. The 1/2.5 [GHZ] is equivalent to a baseband pulse width of 400 picoseconds.

(3) The bit timing generator creates 50 MHz bit timing by dividing the 2.5 GHz frequency by 50. As a result, this frequency division creates a baseband pulse made up of a rectangular wave with a length that is an integer multiple of one period of the carrier wave possessing a frequency set in the center of the transmission band.

(4) A 400 picosecond bi-phase rectangular pulse containing three cycles at 7.5 GHz is next generated for the transmission bit.

(5) A 3-cycle pulse is then generated in the multiplier by multiplying the bi-phase rectangular pulse equivalent to three cycles of 7.5 GHz, by a 7.5 GHz carrier wave. As a result, the baseband pulses are modulated by a carrier wave synchronized with the pulse interval.

The next describes the receive operation on the transmitter/receiver shown in FIG. 8. RF detection, pulse detection, channel estimation, 3-cycle pulse phase correction and phase rotation are performed during receive.

On the receiver side, the received signal is first quadrature-detected with a carrier wave having the same frequency as during transmit, and the baseband pulse train is detected. Quadrature detection is then also performed with signals whose data is set as "ALL1" on the transmitter side. (Usually, the same signal can be acquired by gating the results obtained by quadrature detection only during the pulse period.)

Figure 10:
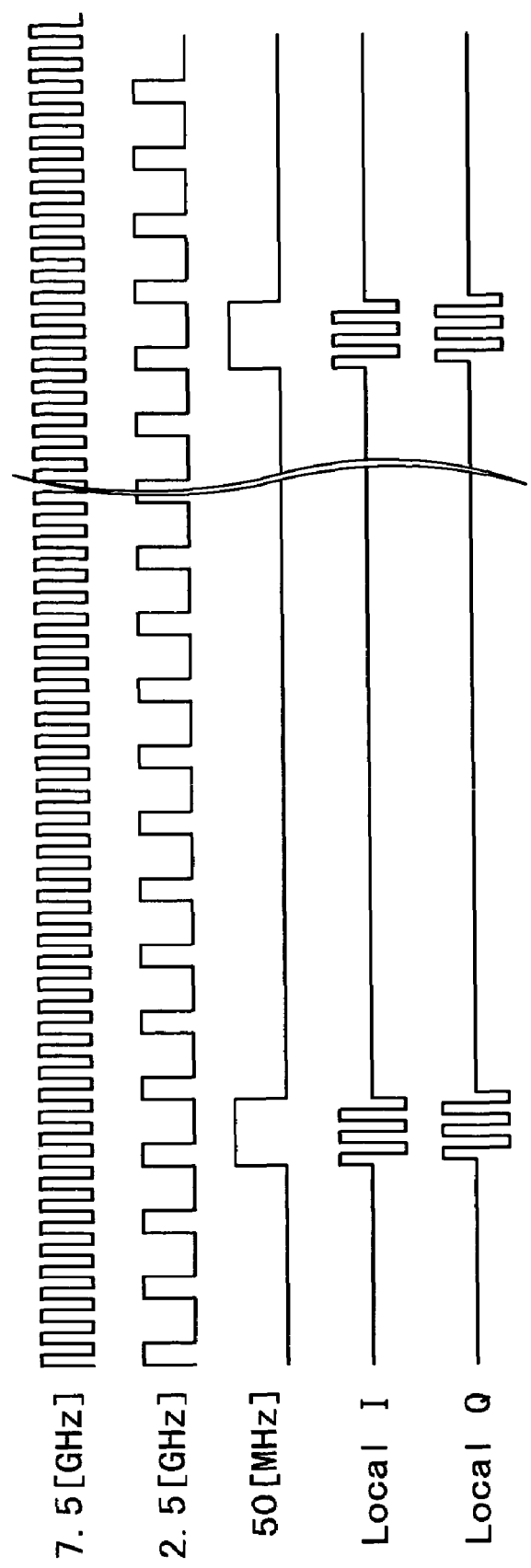
FIG. 10 is a timing chart showing quadrature detection in the detector section on the receive side of the transmitter/receiver shown in FIG. 8.

In that case, 2.5 GHz is generated the same as during transmission, by dividing the 7.5 MHz signal from the free-running oscillator, by 3. The 50 MHz bit timing is then made by dividing 2.5 GHz by 50. The Local I (real part) made up of a 3-cycle pulse is generated by multiplying a bi-phase rectangular pulse equivalent to 3 cycles at 7.5 GHz, by a 7.5 GHz carrier wave. The Local I is a generated at a phase shifted 90 degrees from the Local Q (imaginary part). (Refer to FIG. 10)

Next, in each multiplier, the received signal, and Local I and Local Q are respectively multiplied to obtain the I and Q of the detected RF signal. The detected RF signal is then passed through a low-pass filter (LPF). After filtering, the signal is A/D converted at the pulse peak and digital processing then performed. The received signal is then restored to a baseband pulse by quadrature detection.

Figure 11:
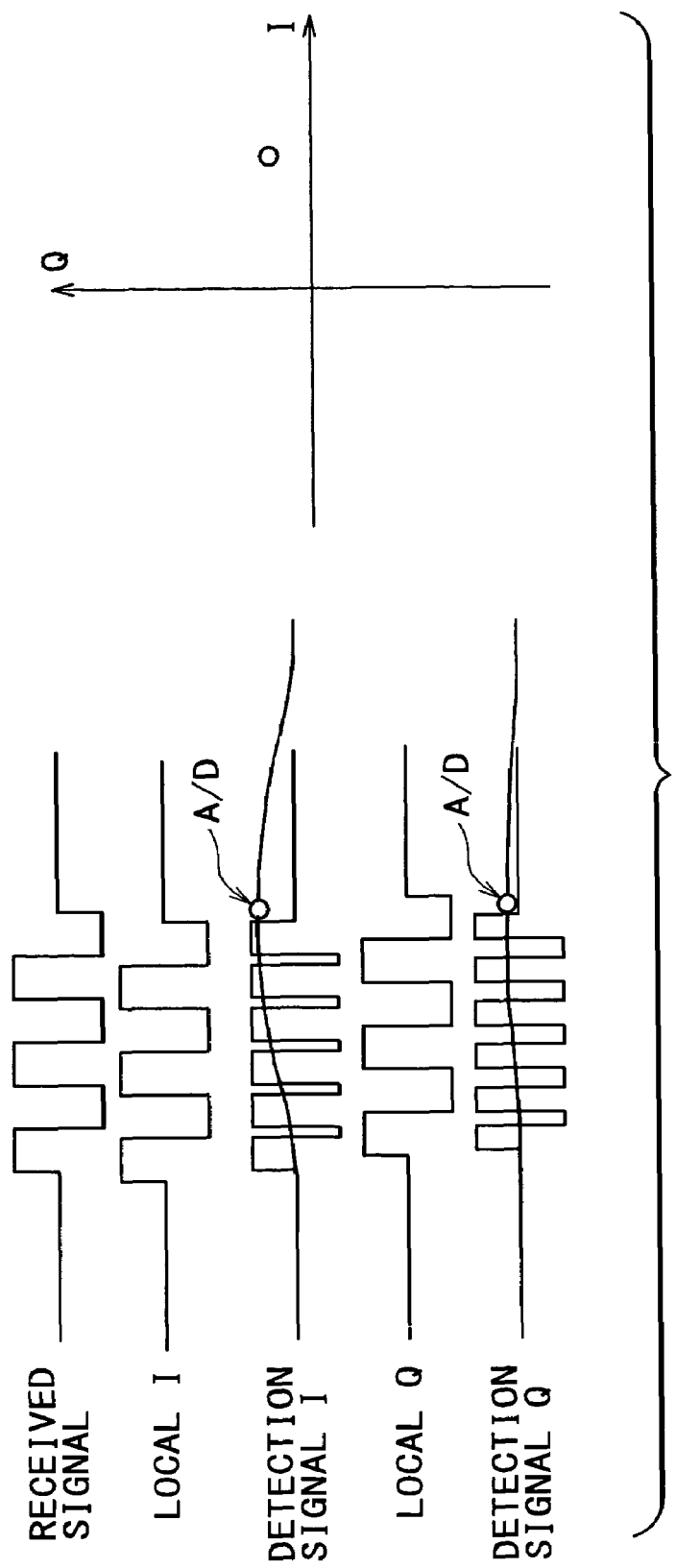
FIG. 11 is a drawing for describing quadrature detection in the detector section on the receive side of the transmitter/receiver shown in FIG. 8.

The left side of FIG. 11 shows A/D conversion state for the pulse peak, after the results from respectively multiplying the received signal and Local I and Local Q are passed through the LPF. The right side of FIG. 11 shows results from mapping the results of quadrature detection on the I-Q plane.

The next describes the pulse detection and channel estimation on the receive side.

The beginning of the transmit signal in the ultra wide band transmit/receive system of the present embodiment contains a training signal (preamble section) for pulse detection and channel estimation. This training signal is a 26 bit period in the following description. The 26 bits may be "ALL1" but regularity may induce problems in the spectrum so a random pattern is used.

A frequency of around 100 MHz is suitable for A/D conversion during pulse detection.

After the initial sampling, a sample is next made after 25 cycles at 2.5 GHz.

Figure 12:
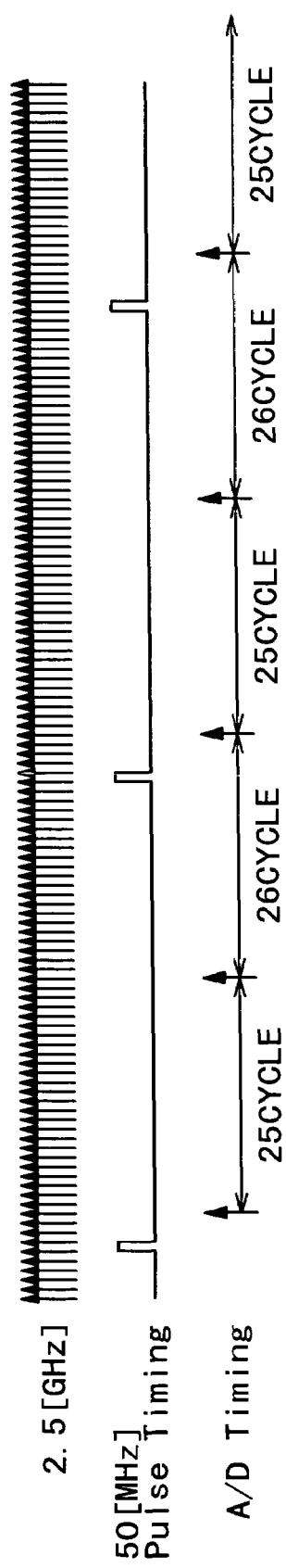
FIG. 12 is a drawing showing pulse detection and channel estimation operation in the detector section on the receive side of the transmitter/receiver shown in FIG. 8; and more specifically shows the status of A/D conversion repeatedly alternating between 25 cycles and 26 cycles.

A sample is next made after 26 cycles. These 25 and 26 cycle intervals alternately repeat (10100 picosecond periods), and AID conversion is performed a total of 50 times. FIG. 12 shows the timing chart format for AID conversions repeatedly alternating at 25 and 26 cycle intervals. The receive pulse timing shown in the intermediate stage is unknown at this point in time.

FIG. 13 shows the structure of the channel estimation buffer. As can be seen from this figure, measurement of 50 points can be performed at a resolution of 400 picoseconds within a pulse period of 20 nanoseconds by repeating a total of 50 A/D conversions alternating at 25 and 26 cycle intervals.

The first position within the 20 nanosecond period (See FIG. 13) is returned to after waiting for the 51 cycles at 2.5 GHz. The 26 bit training signal is sent during this period.

Considering that a signal-to-noise (S/N) ratio of approximately 13 dB is required for pulse detection and also that a S/N ratio of 3 dB is used for decoding the pulses into information bits, then an averaging process of 10 times is required. The 50 sampling measurements are therefore performed in 10 sets, and measurement results are summed at each point. Signals of the same phase are summed by setting a 26 bit cycle training signal.

It is not known where the 26 bit pattern training signal was measured. So the amplitudes of the above described 50 points are next smoothly linked, and the point having the maximum amplitude is determined to be the maximum path (pulse position). FIG. 14 shows identification of the point having the maximum amplitude, by smoothly linking the amplitude of the 50 points within a pulse interval of 20 nanoseconds.

By controlling the phase of 2.5 GHz frequency, the sampling timing is matched at the maximum amplitude to receive, for example a 26 bit portion, at 50 Mbps.

Figure 15:
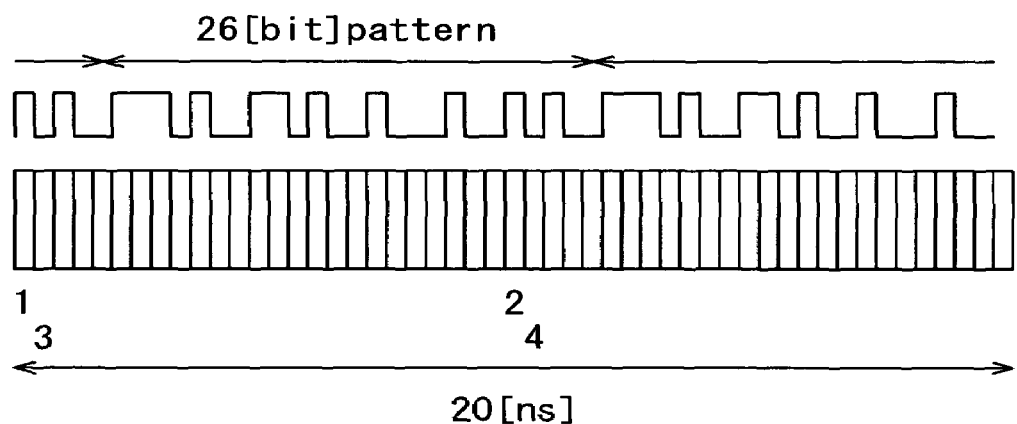
FIG. 15 is a drawing showing pulse detection and channel estimation operation in the detector section on the receive side of the transmitter/receiver shown in FIG. 8; and more specifically shows the correlation between a 26-bit pattern (training signal) and 50 points measured at a resolution of 400 picoseconds within a pulse interval of 20 nanoseconds.

The correlation with the already known training signal of the 26 bit pattern is made, and the point on the 26 bit pattern where the data was received is detected. FIG. 15 shows the correlation between a 26 bit pattern (training signal) and the 50 points measured at a resolution of 400 picoseconds within a pulse interval of 20 nanoseconds.

After the 26 bit pattern becomes clear, measurement values for transmission path characteristics including the state of the multipaths can be obtained similar to complex numbers, by multiplying the measurement data by this pattern.

Figure 16:
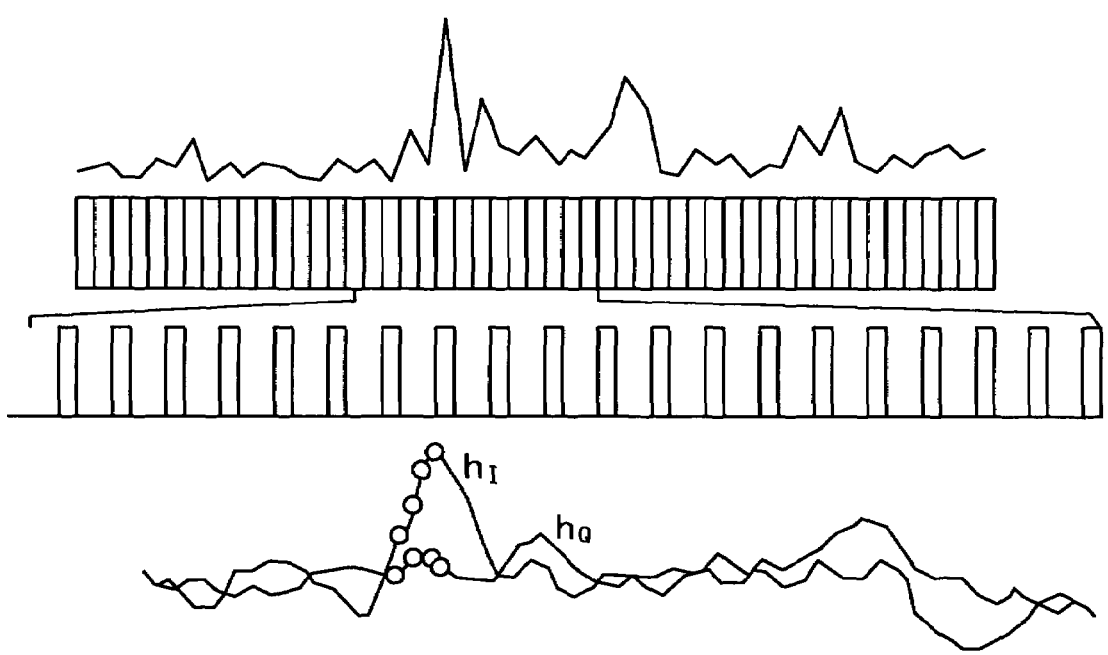
FIG. 16 is a drawing showing pulse detection and channel estimation operation in the detector section on the receive side of the transmitter/receiver shown in FIG. 8; and more specifically shows 3-fold oversampling of the 50 point measurement values, and interpolation between two points.
Figure 17:
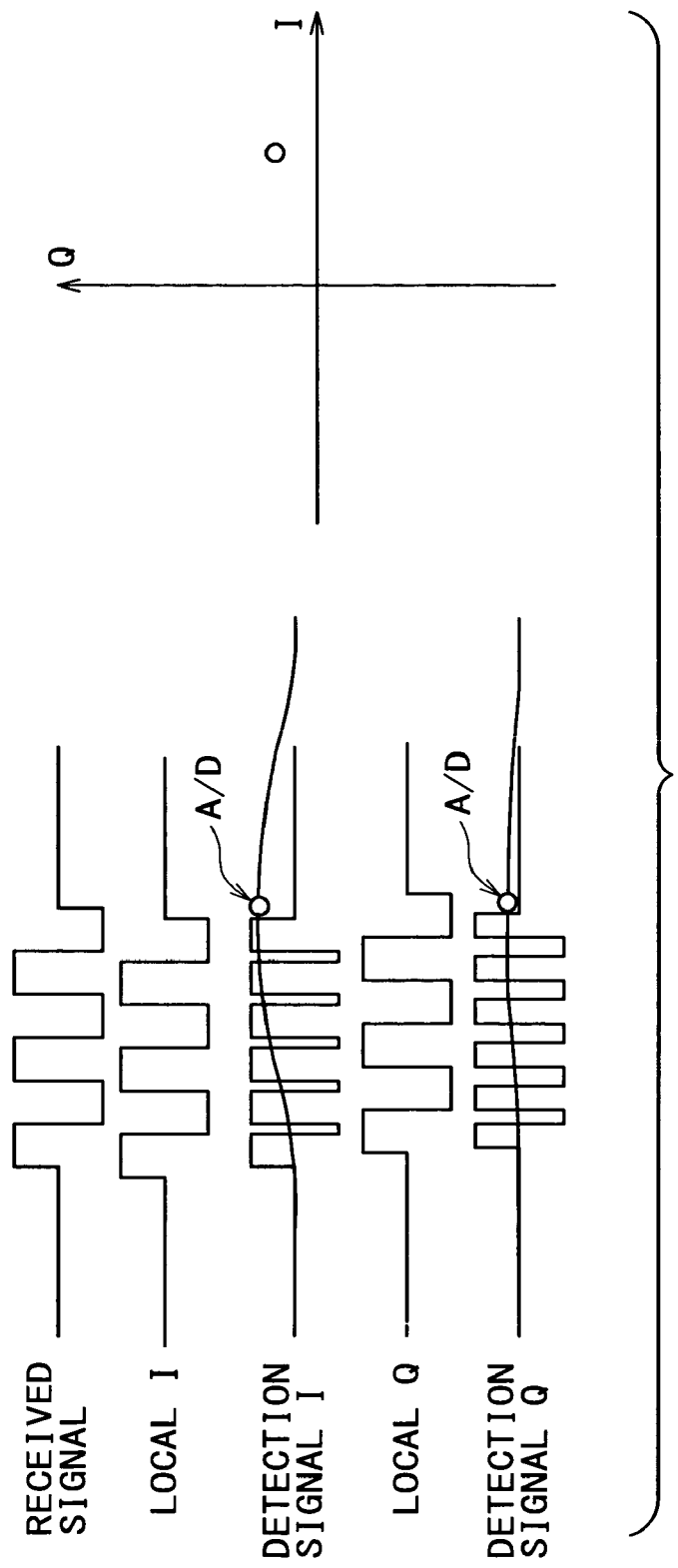
FIG. 17 is a drawing showing 3-cycle pulse phase correction operation in the detector section on the receive side of the transmitter/receiver shown in FIG. 8; and more specifically shows the received data holding phase points on a complex plane.

The measurements for the 50 points described above are oversampled by 3 times (3-fold) and interpolation performed between two points. In this way, a 150 point channel response is calculated at 1.75 GHz equaling a resolution of 133 picoseconds. FIG. 16 shows the state with the 50 point measurement values oversampled by 3 times and interpolation performed between two points.

The timing is matched at a resolution of 133 picoseconds, by obtaining the maximum amplitude at a resolution of 133 picoseconds for these 150 point measurement values, controlling the phase of 2.5 GHz frequency, and dividing the 7.5 GHz frequency by 2 or by 4 one time only instead of division by 3.

The pulse position can be detected in this way and this timing is used to receive the subsequent data.

The pulse position as described above is found as the point where the energy value has become large for a value obtained by summing the I and Q values found by quadrature detection like complex numbers. Instead of this method, however, the pulse position may be determined by integrating the energy value for the A/D value equivalent to the same position within the pulse time interval and then finding the point where that integrated value has become large within the pulse time interval.

The next describes phase correction of the 3-cycle pulse.

In the pulse correction/detection described above, even with a maximum path (See FIG. 14), only the pulse position at the 133 picosecond resolution is aligned. The 7.5 GHz phase (cycle phase of the 3-cycle pulse) has not yet been aligned. The received data therefore has a phase point on the complex plane.

In view of this shifted phase, the corrected I and Q components that were received are used as the received data.

During receive, this phase gradually shifts while being synchronized with the pulse position due to clock difference between the transmitters/receivers. The phase shift is detected during receiving of data, averaged, and used as the reference phase when receiving data.

Figure 18:
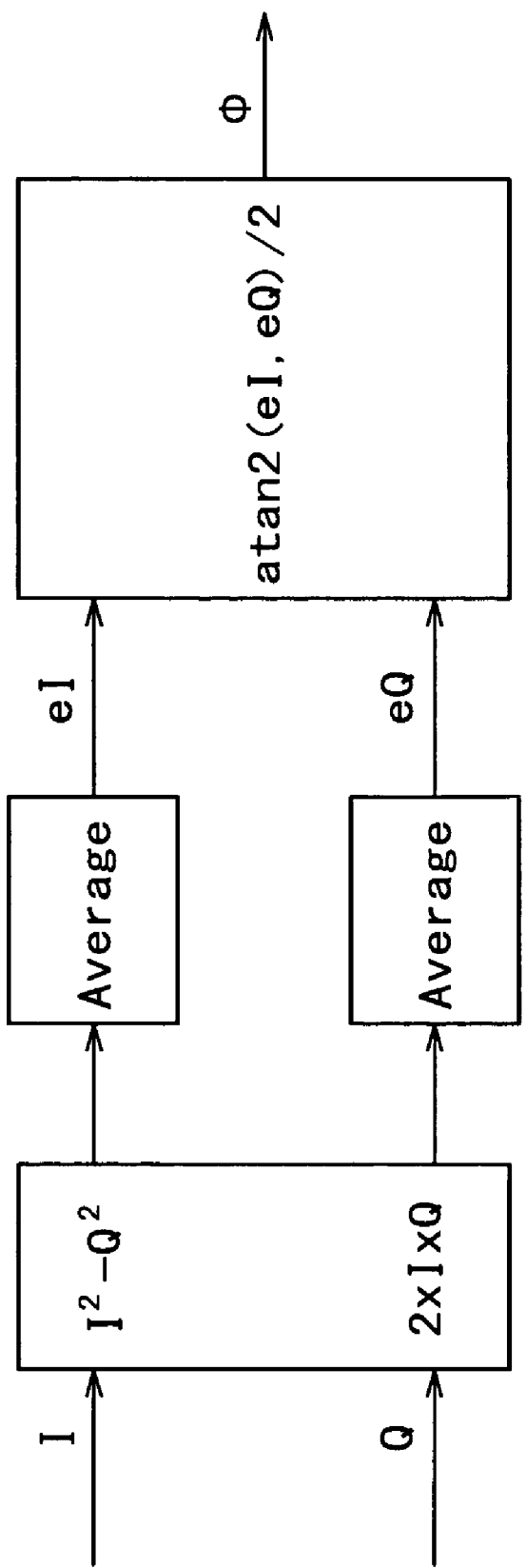
FIG. 18 is a schematic diagram showing the functions for finding the reference phase for receiving data.

FIG. 18 is a schematic diagram showing the functions for finding the reference phase for receiving data. In the example in this figure, to eliminate effects of bi-phase modulation on information data, I+jQ are squared, the $I^2+Q^2+2I\times Q$ values are averaged, and the angle found by taking half of this deflection angle.

The shifts in the reference phase are consecutively measured and at the point where rotated through ±180 degrees (62.5 picosecond pulse shift), the 7.5 GHz frequency divider is returned ±133 picoseconds (±360 degrees of phase difference) by dividing it by 2 or by 4 only one time.

The example in FIG. 19 shows 62.5 picosecond shifts from the state shown in (a) to the state shown in (b). In this case, as shown in (c), the 7.5 GHz frequency divider is to −360 degrees by setting it to 1/4 only one time. However, to simplify the figure, the example given here does not show bi-phase modulation of the information data.

This method for correcting phase shifts is based on the concept that the phase shift is equivalent to the timing shift. In FIG. 20, the 1/3 frequency divider for 7.5 GHz is returned to a phase of ±360 degrees by dividing it by 2 and by 4 one time only.

The next describes the methods during phase rotation and high-speed transmission.

Figure 21:
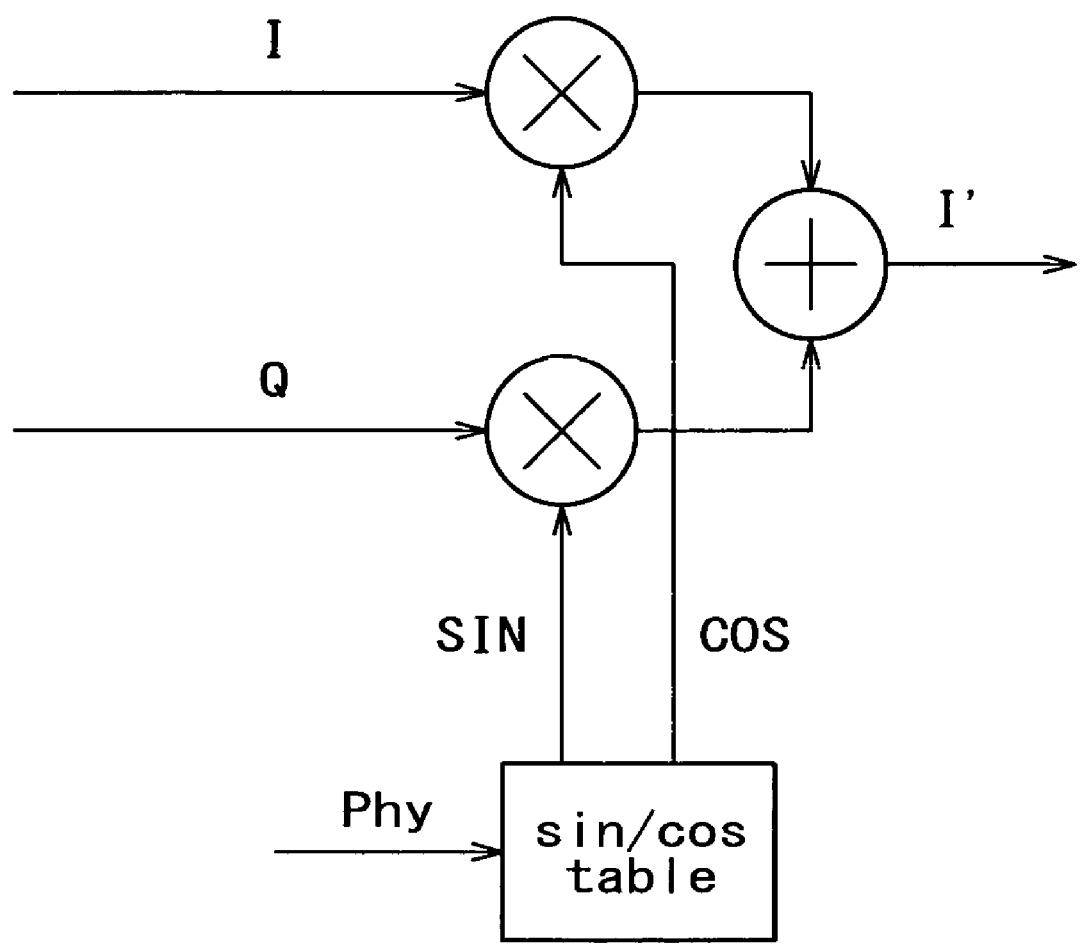
FIG. 21 is a diagram showing the configuration for performing phase correction of the received data.

After detecting the phase shift, the phase in the received data is corrected. The diagram in FIG. 21 shows the concept for phase correction of the received data. In the example in this figure, phase correction is performed using the following formula when the phase has shifted by ⌷. This is bi-phase modulation so only the I component (real part) is rendered.

$$I'+Q'=I+jQ\times exp(-j\phi)=I\cos\phi+Q\sin\phi+j(\ldots) \qquad <Eq.\ 2>$$

When the maximum A/D conversion speed is larger than the bit rate, all the operations can be done with the digital processing methods previously described.

However, a higher bit rate can be achieved at times when the transmission path conditions are satisfactory, for example, there are few multipaths. In such cases, the A/D conversion is performed within a range where conversion is possible, and control for tracking the carrier phase pulse position is implemented (A/D conversion assume 100 Mbps).

On the other hand, phase conversion of information bits is performed by analog type operations, for example, summing/subtracting and inversion of the I and Q. An optimum phase for the phase shift is selected based on these hard decision results.

Figure 22:
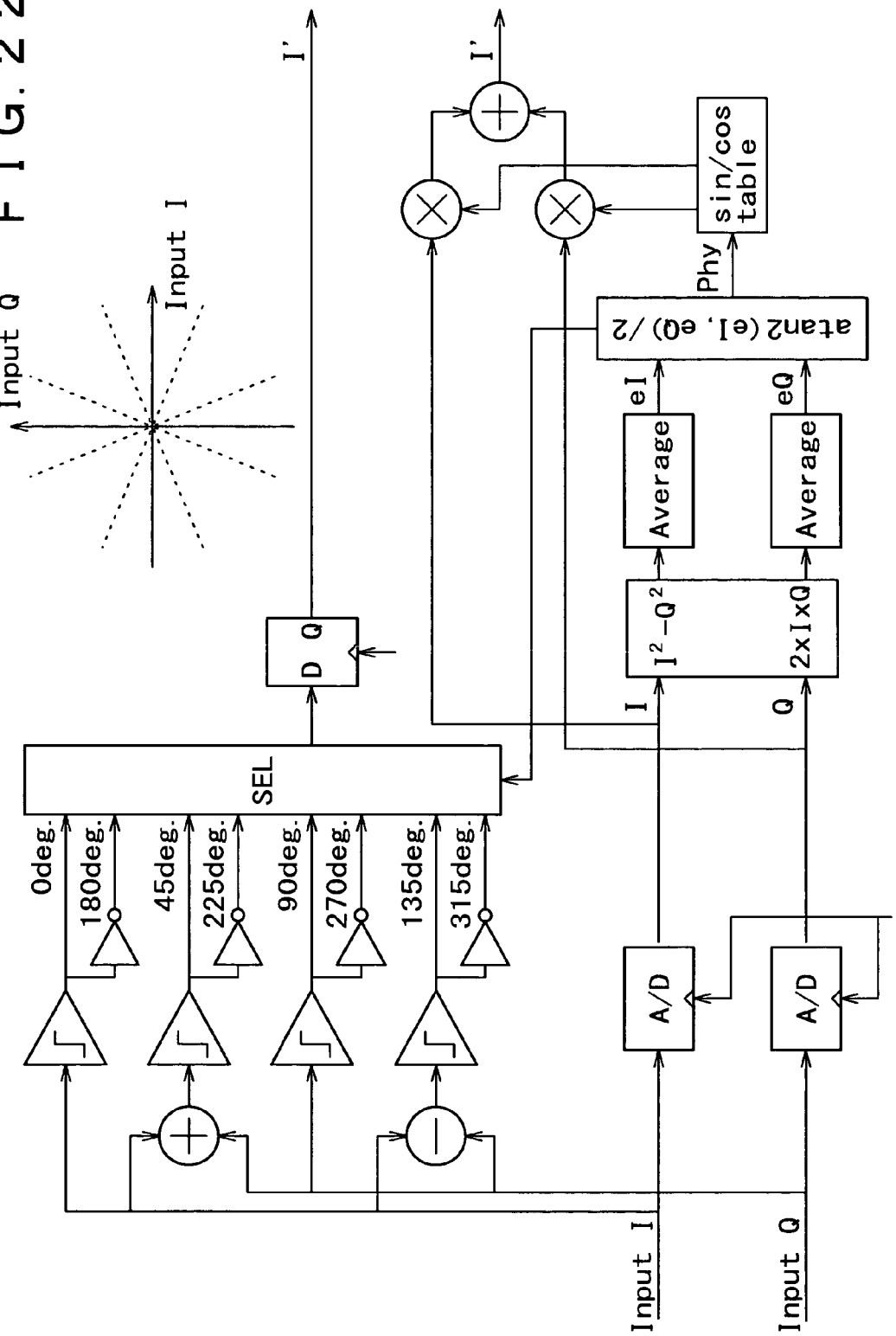
FIG. 22 is a diagram showing function blocks for the phase rotation section for selecting information bits possessing an optimum phase shift.

FIG. 22 is a diagram showing function blocks for the phase rotation section for selecting information bits possessing an optimum phase shift. As shown in the figure, the input of the real part I is supplied to the selector (SEL) after the 0 degree and 180 degree phase rotation is applied by the limit amp. The results from summing the real part I and imaginary part Q are supplied to the selector (SEL) after a 45 degree and 225 degree phase rotation are applied by the limit amp. The input of the imaginary part Q is supplied to the selector (SEL) after a 90 degree and 270 degree phase rotation is applied by the limit amp. The real part I and imaginary part Q subtraction results are supplied to the selector (SEL) after a 135 degree and 315 degree phase rotation are applied by the limit amp. The selector makes hard decision on these results and selects an optimal phase for the phase shift.

Figure 23:
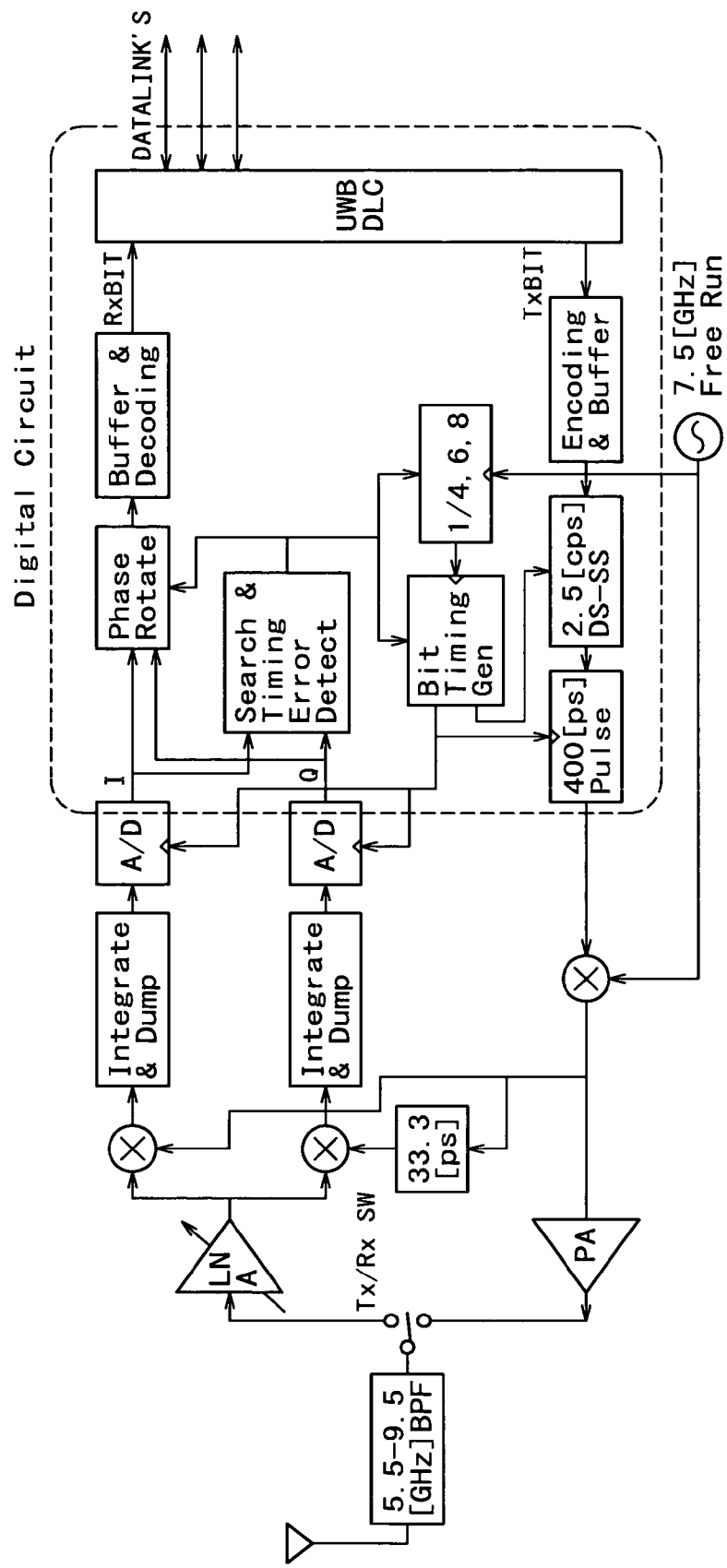
FIG. 23 is a diagram showing the structure of the DS-SS type transmitter/receiver.

The structure and operating characteristics of the transmitter/receiver for the ultra wide band communication system in the embodiment of the present invention was described while referring to the drawings. However, by adding a function module for generating spread codes for DS-SS (Direct Sequence Spread Spectrum) directly to this transmitter/receiver (See FIG. 8), a DS-SS type transmitter/receiver may be configured. FIG. 23 is a diagram showing the structure of the transmitter/receiver containing a circuit module for generating spread codes for DS-SS. The following describes pulse detection and channel estimation, 3-cycle pulse phase tracking, A/D conversion processing, and phase rotation operations for the transmitter/receiver shown in this figure.

The pulse detection and channel estimation during receive are first described.

Despreading requires a time equal to 50 chips and the despread value undergoes A/D conversion. The processing speed for A/D conversion is approximately 50 million samples per second.

After 2.5 GHz sampling in 51 cycle periods, measurements are made over 50 cycles within a 20 nanosecond period and the operation ends. The bits are sent as 51 bits at this time. The training pattern therefore repeats as 51 bits.

This operation is repeated in 10 sets, the measurement values summed, and the S/N ratio improved.

The amplitudes of the 50 points are smoothly linked together, and the point with the largest amplitude is treated as the maximum path.

About 51 bits are received to determine where this point is present within the 51 bit training pattern, and the correlation with the training pattern established.

The 0/1 of the 51 bit training pattern are removed from the measurements to take the detected phase into account.

Channel response for 150 points is found at a resolution of 133 picoseconds by interpolating the 3-fold oversampling.

The timing is matched at a resolution of 133 picoseconds, by obtaining the maximum amplitude at a resolution of 133 picoseconds for these 150 point measurement values, controlling the phase of 2.5 GHz frequency, and dividing the 7.5 GHz frequency by 2 or by 4 one time instead of division by 3. This timing is used to receive the subsequent data.

The next describes phase correction of the 3-cycle pulse.

In the pulse correction/detection described above, even with a maximum path, only the pulse position at the 133 picosecond resolution is aligned. The 7.5 GHz phase (cycle phase of the 3-cycle pulse) has not yet been aligned. The received data therefore has a phase point on the complex plane.

In view of this shifted phase, the corrected I and Q components that were received are used as the received data.

During receive, this phase gradually shifts while being synchronized with the pulse position due to clock difference between the transmitters/receivers. The phase shift is detected during receiving of data, averaged, and used as the reference phase when receiving data.

The shifts in the reference phase are consecutively measured and at the point where rotated through ±180 degrees (62.5 picosecond pulse shift), the 7.5 GHz frequency divider is returned ±133 picoseconds ±360 degrees of phase difference) by dividing it by 2 or by 4 only one time.

When the timing has deviated, correction can only be performed with 1/7.5 GHz=133 picosecond units. The phase of 7.5 GHz or below can be digitally detected and corrected.

The next describes A/D conversion and phase rotation.

If the phase shift can be detected, then phase correction of the received data can be performed.

Digital processing is usually performed if the A/D conversion speed is faster than the bit rate.

During high-speed bit rate transmissions, however, at least the A/D conversion is performed within a range where AD conversion is possible, and control of the carrier phase and pulse position implemented.

The phase of the information bits are corrected at a phase with a 45 degree resolution and hard decision performed.

The present invention was described while referring to the specified embodiments. However, it is apparent that one skilled in the related art can revise or substitute the configuration of the embodiments without departing from the spirit or scope of the present invention. In other words, these embodiments serve only as examples for describing the present invention and cannot be interpreted as limiting the contents of these specifications. The section containing the patent claims should be referred to in order to judge the subject matter of the present invention.

The present invention is capable of providing a transmitter and transmitting method, receiver and receiving method, pulse detection method, and tracking method ideal for ultra wideband communications (UWB) by sending and receiving information signals comprised of an extremely short impulse signal train of several hundred picoseconds.

The present invention is further capable of providing a transmitter and transmitting method, receiver and receiving method, pulse detection method, and tracking method ideal for transmitting and receiving while avoiding spectrum problems in ultra wide band communication systems.

The present invention is also capable of providing a transmitter and transmitting method, receiver and receiving method, pulse detection method, and tracking method ideal because of a simple circuit design and ability to shorten the time required for synchronization.

What is clamed is:

1. A transmitter comprising:
a carrier wave generation means for generating a carrier wave possessing a predetermined frequency;
a baseband pulse generation means for generating baseband pulses at time intervals equal to a fraction 1/n of said predetermined frequency (n is an integer); and
a modulation means for modulating said baseband pulses with said carrier wave and generating an n cycle pulse,
wherein said carrier wave generation means generates a carrier wave possessing a frequency set in a center of the transmission band.

2. A transmitter comprising:
a baseband pulse generation means for generating baseband pulses with a pulse width equal to a rectangular wave pulse length that is an integer multiple of one cycle of a predetermined frequency carrier wave possessing a frequency set in a center of a band not interfering with communication systems already in use; and
a modulation means for modulating said baseband pulses with said carrier wave and generating an n cycle pulse with a number of cycles n equal to the integer multiple.

3. A transmitter comprising:
a baseband pulse generation means for generating baseband pulses with a pulse width equal to a rectangular wave pulse length that is an integer multiple of one cycle of a predetermined frequency carrier wave; and
a modulation means for modulating said baseband pulses with said carrier wave and generating an n cycle pulse with a number of cycles n equal to the integer multiple,
wherein said carrier wave has a frequency set in a center of the transmission band.

4. A transmitter comprising:
a carrier wave generation means for generating a carrier wave possessing a predetermined frequency;
a baseband pulse generation means for generating baseband pulses at time intervals equal to a fraction 1/n of said predetermined frequency (n is an integer); and
a modulation means for modulating said baseband pulses with said carrier wave and generating an n cycle pulse, wherein said carrier wave generation means generates a carrier wave possessing a frequency set in a center of a band not interfering with communication systems already in use.

5. A transmitter according to claim 1, wherein said modulation means converts the frequency of said baseband pulses by using said carrier wave.

6. A transmission method comprising:
generating a carrier wave possessing a predetermined frequency set in a center of the transmission band;
generating baseband pulses at time intervals equal to a fraction 1/n of said frequency (n is an integer);
modulating said baseband pulses by using said carrier wave; and
generating and transmitting an n cycle pulse.

7. A transmitter comprising:
a carrier wave generation means for generating a carrier wave possessing a predetermined frequency;
a baseband pulse generation means for generating baseband pulses at time intervals equal to a fraction 1/n of said predetermined frequency (n is an integer);
a modulation means for modulating said baseband pulses with said carrier wave and generating an n cycle pulse; and
a spread code generator module for generating spread codes for direct spectrum spread.

8. A transmitter comprising:
a carrier wave generator configured to generate a carrier wave possessing a predetermined frequency set in a center of the transmission band;
a baseband pulse generator configured to generate baseband pulses at time intervals equal to a fraction 1/n of said predetermined frequency (n is an integer); and
a modulator configured to modulate said baseband pulses with said carrier wave and to create an n cycle pulse.

9. A transmitter comprising:
a baseband pulse generator configured to generate baseband pulses with a pulse width equal to a rectangular wave pulse length that is an integer multiple of one cycle of a predetermined frequency carrier wave set in a center of the transmission band; and
a modulator configured to modulate said baseband pulses with said carrier wave and to create an n cycle pulse with a number of cycles n equal to the integer multiple.

10. A transmission method comprising:
generating a carrier wave possessing a predetermined frequency set in a center of a band not interfering with communication systems already in use;
generating baseband pulses at time intervals equal to a fraction 1/n of said frequency (n is an integer);
modulating said baseband pulses by using said carrier wave; and
generating and transmitting an n cycle pulse.

11. A transmitter comprising:
a carrier wave generator configured to generate a carrier wave possessing a predetermined frequency set in a center of a band not interfering with communication systems already in use;
a baseband pulse generator configured to generate baseband pulses at time intervals equal to a fraction 1/n of said predetermined frequency (n is an integer); and
a modulator configured to modulate said baseband pulses with said carrier wave and to create an n cycle pulse.

12. A transmitter comprising:
a baseband pulse generator configured to generate baseband pulses with a pulse width equal to a rectangular wave pulse length that is an integer multiple of one cycle of a predetermined frequency carrier wave, said predetermined frequency carrier wave possessing a frequency set in a center of a band not interfering with communication systems already in use; and
a modulator configured to modulate said baseband pulses with said carrier wave and to create an n cycle pulse with a number of cycles n equal to the integer multiple.

* * * * *